US012739560B2

(12) United States Patent
Wang et al.

(10) Patent No.: US 12,739,560 B2
(45) Date of Patent: Sep. 15, 2026

(54) ACOUSTIC DEVICES

(71) Applicant: SHENZHEN SHOKZ CO., LTD., Shenzhen (CN)

(72) Inventors: Zhen Wang, Shenzhen (CN); Jianing Liang, Shenzhen (CN); Lei Zhang, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 328 days.

(21) Appl. No.: 18/500,088

(22) Filed: Nov. 1, 2023

(65) Prior Publication Data

US 2024/0064460 A1 Feb. 22, 2024

Related U.S. Application Data

(63) Continuation of application No. PCT/CN2023/100403, filed on Jun. 15, 2023.

(30) Foreign Application Priority Data

Nov. 21, 2022 (CN) ......................... 202211455122.0

(51) Int. Cl.
*H04R 1/32* (2006.01)
*H04R 1/10* (2026.01)

(52) U.S. Cl.
CPC ............ *H04R 1/32* (2013.01); *H04R 1/1016* (2013.01); *H04R 1/1058* (2013.01); *H04R 1/323* (2013.01)

(58) Field of Classification Search
CPC ........ H04R 1/32; H04R 1/106; H04R 1/1058; H04R 1/323; H04R 1/2884; H04R 1/2896; G10K 11/162
See application file for complete search history.

(56) References Cited

U.S. PATENT DOCUMENTS 4,742,887 A 5/1988 Yamagishi
10,469,939 B1 11/2019 Tikander et al.
(Continued)

FOREIGN PATENT DOCUMENTS

CN 105101020 A 11/2015
CN 106101956 A 11/2016
(Continued)

OTHER PUBLICATIONS

C.R. Sabirin et al. "Noise reduction of a sound filed inside a cavity due to an adaptive Helmholtz resonator", 2012 (Year: 2012).*
(Continued)

*Primary Examiner* — Sunita Joshi
(74) *Attorney, Agent, or Firm* — METIS IP LLC

(57) ABSTRACT

The present disclosure discloses acoustic devices. The acoustic device may include a diaphragm; a housing configured to accommodate the diaphragm and form a first acoustic cavity and a second acoustic cavity respectively corresponding to a front side and a rear side of the diaphragm, wherein the diaphragm radiates sounds to the first acoustic cavity and the second acoustic cavity, respectively, and the sounds are guided through a first acoustic hole coupled with the first acoustic cavity and a second acoustic hole coupled with the second acoustic cavity, respectively; and a sound absorption structure, wherein the sound absorption structure is coupled with the second acoustic cavity and is configured to absorb the sound transmitted to the second acoustic hole through the second acoustic cavity in a target frequency range, the target frequency range including a resonant frequency of the second acoustic cavity.

20 Claims, 13 Drawing Sheets

(56) References Cited

U.S. PATENT DOCUMENTS

| | | | | |
|---|---|---|---|---|
| 2012/0106774 | A1 | 5/2012 | Saiki | |
| 2012/0155688 | A1 | 6/2012 | Wilson | |
| 2013/0266170 | A1 | 10/2013 | Yamagishi | |
| 2015/0023515 | A1 | 1/2015 | Reimert | |
| 2017/0208386 | A1 | 7/2017 | Yang et al. | |
| 2019/0052954 | A1 | 2/2019 | Rusconi Clerici Beltrami et al. | |
| 2019/0132689 | A1 | 5/2019 | Qi et al. | |
| 2019/0158951 | A1* | 5/2019 | Cao | H04R 9/025 |
| 2021/0067857 | A1 | 3/2021 | Struzik | |
| 2021/0219074 | A1 | 7/2021 | Zhang et al. | |
| 2022/0014849 | A1 | 1/2022 | Christiansen | |
| 2022/0070570 | A1 | 3/2022 | Zhang et al. | |
| 2022/0078546 | A1 | 3/2022 | Liu et al. | |
| 2022/0182754 | A1 | 6/2022 | Fu et al. | |
| 2022/0295167 | A1 | 9/2022 | Xu et al. | |
| 2022/0337939 | A1* | 10/2022 | Liu | H04R 1/025 |
| 2022/0377454 | A1 | 11/2022 | Kueller | |

FOREIGN PATENT DOCUMENTS

| | | | | |
|---|---|---|---|---|
| CN | 206963065 | U | 2/2018 | |
| CN | 109121038 | A | 1/2019 | |
| CN | 109218939 | A | 1/2019 | |
| CN | 213694081 | U | 7/2021 | |
| CN | 113556655 | A | 10/2021 | |
| CN | 214708008 | U | 11/2021 | |
| DE | 102020201533 | A1 * | 8/2021 | H04R 25/48 |
| EP | 0448110 | A2 * | 9/1991 | H04R 1/1016 |
| JP | H03274892 | A | 12/1991 | |
| JP | H08185189 | A | 7/1996 | |
| JP | 2004341470 | A | 12/2004 | |
| JP | 2007047560 | A | 2/2007 | |
| WO | 2011082510 | A1 | 7/2011 | |
| WO | 2014111068 | A2 | 7/2014 | |
| WO | 2019218667 | A1 | 11/2019 | |
| WO | 2022020122 | A1 | 1/2022 | |
| WO | 2022091255 | A1 | 5/2022 | |

OTHER PUBLICATIONS

Ma, Dayou, Theory and Design of Micro-Perforated Plate Sound-Absorbing Structure, Chinese Science, 1975, 14 pages.

Lin, Lei et al., Effect of sound-absorbing material on a microperforated absorbing construction, Acta Acustica, 35 (4): 385-392, 2010.

Notice of Reasons for Rejection in Japanese Application No. 2024-540960 mailed on Jul. 1, 2025, 18 pages.

The Extended European Search Report in European Application No. 23826262.0 mailed on Apr. 8, 2025, 14 pages.

Chang, Daoqing et al., An Electromechanical Low Frequency Panel Sound Absorber, The Journal of the Acoustical Society of America, 128(2): 639-645, 2010.

First Examination Report in Indian Application No. 202417027251 mailed on Feb. 20, 2026, 9 pages.

Notice of Reason for Rejection in Japanese Application No. 2024-532563 mailed on Jun. 3, 2025, 10 pages.

Notice of Preliminary Rejection in Korean Application No. 10-2024-7015934 mailed on May 27, 2025, 12 pages.

Chen, Liang et al., Sound Absorption Characteristics of Micro-perforated Panel and Polyurethane Micro-porous Membrane Composed Structures, Noise and Vibration Control, 42(3): 36-41, 2022.

First Office Action in Chinese Application No. 202210726963.4 mailed on Apr. 15, 2026, 28 pages.

* cited by examiner

ACOUSTIC DEVICES

CROSS-REFERENCE TO RELATED APPLICATION

This application is a continuation of International Application No. PCT/CN2023/100403, filed on Jun. 15, 2023, which claims priority to International Application No. PCT/CN2022/101273, filed on Jun. 24, 2022, and Chinese Patent Application No. 202211455122.0, filed on Nov. 21, 2022, the entire contents of each of which are hereby incorporated by reference.

TECHNICAL FIELD

The present disclosure relates to the field of acoustic devices, and in particular, to acoustic devices.

BACKGROUND

To solve the problem of sound leakage of acoustic devices, two or more sound sources may be used to emit two sound signals with opposite phases. In a far field, a sound path difference between two sound sources with the opposed phases reaching a certain point in the far field may be basically negligible such that the two sound signals may cancel each other out to reduce a sound leakage in the far field, which may achieve a sound leakage reduction effect, but there may be still certain limitations. For example, since a wavelength of a high-frequency sound leakage is relatively short, a distance between the two sound sources in the far field may be not negligible compared to the wavelength such that the sound signals emitted by the two sources cannot cancel each other out. As another example, when an acoustic transmission structure of the acoustic device resonates, there may be a certain phase difference between a phase of a sound signal actually radiated by a sound outlet of the acoustic device and an original phase of a position where a sound wave is generated, and an additional resonant peak may be added in the transmitted sound wave, which may result in a chaotic sound field distribution, make it difficult to ensure the sound leakage reduction effect in the far field at high frequencies, and even increase the sound leakage.

Therefore, it is desirable to provide an acoustic device with a relatively good directional sound field.

SUMMARY

One of the embodiments of the present disclosure provides an acoustic device. The acoustic device may include: a diaphragm; a housing configured to accommodate the diaphragm and form a first acoustic cavity and a second acoustic cavity respectively corresponding to a front side and a rear side of the diaphragm, wherein the diaphragm radiates sounds to the first acoustic cavity and the second acoustic cavity, respectively, and the sounds are guided through a first acoustic hole coupled with the first acoustic cavity and a second acoustic hole coupled with the second acoustic cavity, respectively; and a sound absorption structure, wherein the sound absorption structure is coupled with the second acoustic cavity and is configured to absorb the sound transmitted to the second acoustic hole through the second acoustic cavity in a target frequency range, the target frequency range including a resonant frequency of the second acoustic cavity.

In some embodiments, the target frequency range may further include a resonant frequency of the first acoustic cavity.

In some embodiments, the target frequency range may include 3 kHz-6 kHz.

In some embodiments, the sound absorption structure may have a sound absorption effect of greater than or equal to 3 dB on the sound in the target frequency range.

In some embodiments, the sound absorption structure may have a sound absorption effect of greater than or equal to 14 dB on the sound at the resonant frequency.

In some embodiments, the sound absorption structure may include a micro-perforated plate and a cavity, and the micro-perforated plate may include at least one through hole, the second acoustic cavity coupled with the sound absorption structure being in flow communication with the cavity through the at least one through hole.

In some embodiments, the cavity may be at least partially filled with N'Bass sound absorption particles.

In some embodiments, a diameter of at least one of the N'Bass sound absorption particles may be in a range of 0.15 mm-0.7 mm.

In some embodiments, a filling ratio of the N'Bass sound absorption particles in the cavity may be in a range of 70%-95%.

In some embodiments, a gauze mesh may be disposed between the N'Bass sound absorption particles and the micro-perforated plate.

In some embodiments, the cavity may be at least partially filled with a porous sound absorption material, and a porosity of the porous sound absorption material may be greater than 70%.

In some embodiments, a ratio of a hole spacing between two through holes in the at least one through hole to a hole diameter of the at least one through hole may be greater than 5.

In some embodiments, a ratio of a wavelength of a sound in the target frequency range to the hole spacing between two through holes in the at least one through hole on the micro-perforated plate may be greater than 5.

In some embodiments, the hole diameter of the at least one through hole may be in a range of 0.1 mm-0.2 mm, a perforation rate of the micro-perforated plate may be in a range of 2%-5%, a plate thickness of the micro-perforated plate may be in a range of 0.2 mm-0.7 mm, and a height of the cavity may be in a range of 7 mm-10 mm.

In some embodiments, the hole diameter of the at least one through hole may be in a range of 0.2 mm-0.4 mm, the perforation rate of the micro-perforated plate is in the range of 1%-5%, the plate thickness of the micro-perforated plate may be in a range of 0.2 mm-0.7 mm, and the height of the cavity may be in a range of 4 mm-9 mm.

In some embodiments, the micro-perforated plate may include a runway-type micro-perforated plate or a circular micro-perforated plate.

In some embodiments, a plate thickness of the circular micro-perforated plate may be in a range of 0.3 mm-1 mm.

In some embodiments, a Young's modulus of the micro-perforated plate may be in a range of 5 Gpa-200 Gpa.

In some embodiments, an intrinsic frequency of the micro-perforated plate may be greater than 500 Hz.

In some embodiments, the intrinsic frequency of the micro-perforated plate may be in a range of 500 Hz-3.6 kHz.

In some embodiments, the height of the cavity may be in a range of 0.5 mm-10 mm.

In some embodiments, the micro-perforated plate may include a metal micro-perforated plate.

In some embodiments, a waterproof and breathable structure may be disposed on a side of the micro-perforated plate facing the diaphragm.

In some embodiments, the acoustic device may further include a magnetic circuit assembly and a coil. The coil may be connected to the diaphragm, at least a portion of the coil may be disposed in a magnetic gap formed by the magnetic circuit assembly, and the coil may drive the diaphragm to vibrate to produce the sounds when energized, the micro-perforated plate including an annular structure disposed around the magnetic circuit assembly.

In some embodiments, the acoustic device may further include a magnetic circuit assembly and a coil. The coil may be connected to the diaphragm, at least a portion of the coil may be disposed in a magnetic gap formed by the magnetic circuit assembly, and the coil may drive the diaphragm to vibrate to produce the sounds when energized, the micro-perforated plate and the magnetic circuit assembly being disposed at an interval in a vibration direction of the diaphragm.

In some embodiments, the acoustic device may further include a magnetic circuit assembly and a coil. The coil may be connected to the diaphragm, at least a portion of the coil may be disposed in a magnetic gap formed by the magnetic circuit assembly, and the coil may drive the diaphragm to vibration to produce the sounds when energized, the micro-perforated plate including a magnetic conductive element in the magnetic circuit assembly.

One of the embodiments of the present disclosure provides an acoustic device. The acoustic device may include: a diaphragm; a housing configured to accommodate the diaphragm and form a first acoustic cavity and a second acoustic cavity respectively corresponding to a front side and a rear side of the diaphragm, wherein the diaphragm radiates sounds to the first acoustic cavity and the second acoustic cavity, respectively, and the sounds are guided through a first acoustic hole coupled with the first acoustic cavity and a second acoustic hole coupled with the second acoustic cavity, respectively; and a sound absorption structure, wherein the sound absorption structure is coupled with the second acoustic cavity and is configured to absorb the sound transmitted to the second acoustic cavity through the second acoustic hole in a target frequency range, and in the target frequency range, a sound pressure level at the second acoustic hole when the sound absorption structure is not disposed is greater than a sound pressure level at the second acoustic hole when the sound absorption structure is disposed.

In some embodiments, the target frequency range may include 3 kHz-6 kHz.

In some embodiments, in the target frequency range, a difference between the sound pressure level at the second acoustic hole when the sound absorption structure is not disposed and the sound pressure level at the second acoustic hole when the sound absorption structure is disposed may be greater than or equal to 3 dB.

In some embodiments, the target frequency range may include a resonant frequency of the second acoustic cavity.

In some embodiments, at the resonant frequency, the difference between the sound pressure level at the second acoustic hole when the sound absorption structure is not disposed and the sound pressure level at the second acoustic hole when the sound absorption structure is disposed may be greater than or equal to 14 dB.

In some embodiments, the sound absorption structure may include a micro-perforated plate and a cavity, and the micro-perforated plate may include at least one through hole, the second acoustic cavity coupled with the sound absorption structure being in flow communication with the cavity through the at least one through hole.

In some embodiments, the cavity may be at least partially filled with N'Bass sound absorption particles.

In some embodiments, a diameter of at least one of the N'Bass sound absorption particles may be in a range of 0.15 mm-0.7 mm.

In some embodiments, a filling ratio of the N'Bass sound absorption particles in the cavity may be in a range of 70%-95%.

In some embodiments, a gauze mesh may be disposed between the N'Bass sound absorption particles and the micro-perforated plate.

In some embodiments, the cavity may be at least partially filled with a porous sound absorption material, and a porosity of the porous sound absorption material may be greater than 70%.

In some embodiments, a ratio between a hole spacing between two through holes in the at least one through hole to a hole diameter of the at least one through hole may be greater than 5.

In some embodiments, a ratio of a wavelength of a sound in the target frequency range to the hole spacing between two through holes in the at least one through hole on the micro-perforated plate may be greater than 5.

In some embodiments, the hole diameter of the at least one through hole may be in a range of 0.1 mm-0.2 mm, a perforation rate of the micro-perforated plate may be in a range of 2%-5%, a plate thickness of the micro-perforated plate may be in a range of 0.2 mm-0.7 mm, and a height of the cavity may be in a range of 7 mm-10 mm.

In some embodiments, the hole diameter of the at least one through hole may be in a range of 0.2 mm-0.4 mm, the perforation rate of the micro-perforated plate may be in a range of 1%-5%, the plate thickness of the micro-perforated plate may be in a range of 0.2 mm-0.7 mm, and the height of the cavity may be in a range of 4 mm-9 mm.

In some embodiments, the micro-perforated plate may include a runway-type micro-perforated plate or a circular micro-perforated plate.

In some embodiments, a plate thickness of the circular micro-perforated plate may be in a range of 0.3 mm-1 mm.

In some embodiments, a Young's modulus of the micro-perforated plate may be in a range of 5 Gpa-200 Gpa.

In some embodiments, an intrinsic frequency of the micro-perforated plate may be greater than 500 Hz.

In some embodiments, the intrinsic frequency of the micro-perforated plate may be in a range of 500 Hz-3.6 kHz.

In some embodiments, a height of the cavity may be in a range of 0.5 mm-10 mm.

In some embodiments, the micro-perforated plate may include a metal micro-perforated plate.

In some embodiments, a waterproof and breathable structure may be disposed on a side of the micro-perforated plate facing the diaphragm.

In some embodiments, the acoustic device may further include a magnetic circuit assembly and a coil. The coil may be connected to the diaphragm, at least a portion of the coil may be disposed in a magnetic gap formed by the magnetic circuit assembly, and the coil may drive the diaphragm to vibrate to produce the sounds when energized, the micro-perforated plate including an annular structure disposed around the magnetic circuit assembly.

In some embodiments, the acoustic device may further include a magnetic circuit assembly and a coil. The coil may be connected to the diaphragm, at least a portion of the coil may be disposed in a magnetic gap formed by the magnetic circuit assembly, and the coil may drive the diaphragm to vibrate to produce the sounds when energized, the micro-perforated plate and the magnetic circuit assembly being disposed at an interval in a vibration direction of the diaphragm.

In some embodiments, the acoustic device may further include a magnetic circuit assembly and a coil. The coil may be connected to the diaphragm, at least a portion of the coil may be disposed in a magnetic gap formed by the magnetic circuit assembly, and the coil may drive the diaphragm to vibrate to produce the sounds when energized, the micro-perforated plate including a magnetic conductive element in the magnetic circuit assembly.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
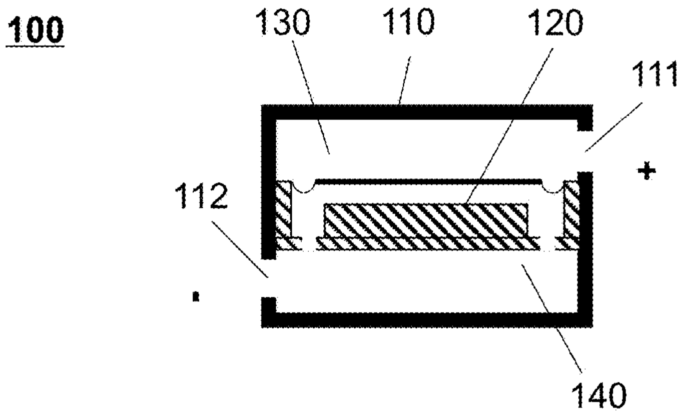
FIG. 1 is a schematic diagram illustrating an exemplary acoustic device according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the “system,” “device,” “unit,” and/or “module” used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram illustrating an exemplary acoustic device according to some embodiments of the present disclosure. As shown in FIG. 1, the acoustic device 100 may include a housing 110 and a speaker 120. The speaker 120 may be disposed in a cavity formed by the housing 110, and a front side and a rear side of the speaker 120 may be provided with a first acoustic cavity 130 and a second acoustic cavity 140 configured to radiate sounds, respectively. The housing 110 may be provided with a first acoustic hole 111 and a second acoustic hole 112, the first acoustic cavity 130 may be acoustically coupled with the first acoustic hole 111, and the second acoustic cavity 140 may be acoustically coupled with the second acoustic hole 112. When a user uses the acoustic device 100, the acoustic device 100 may be placed near an auricle of the user, and the first acoustic hole 111 may face an opening of an ear canal of the user, so that the sound radiated from the first acoustic hole 111 may be transmitted to an earhole of the user. The second acoustic hole 112 may be disposed away from the opening of the ear canal relative to the first acoustic hole 111, and a distance between the first acoustic hole 111 and the opening of the ear canal may be smaller than a distance between the second acoustic hole 112 and the opening of the ear canal.

In some embodiments, the front side and the rear side of the speaker 120 may each serve as a sound wave generation structure and generate a set of sound waves (or voices) with an equal amplitude and opposite phases. In some embodiments, the set of sound waves with an equal amplitude and opposite phases may be radiated outwardly through the first acoustic hole 111 and the second acoustic hole 112, respectively. When the speaker 120 outputs the sound waves, the sound wave on the front side of the speaker 120 (or referred to as a first sound wave) may be emitted from the first acoustic hole 111 through the first acoustic cavity 130, and the sound wave on the rear side of the speaker 120 (or referred to as a second sound wave) may be emitted from the second acoustic hole 112 through the second acoustic cavity 140, thereby forming dipole sound sources including the first acoustic hole 111 and the second acoustic hole 112. The dipole sound sources may undergo interference cancellation at a spatial point (e.g., in a far field), thereby effectively reducing a sound leakage in the far field of the acoustic device 100.

Figure 2A:
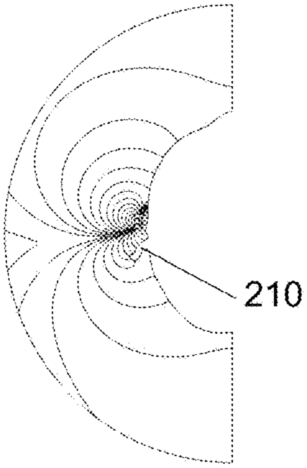
FIG. 2A is a schematic diagram illustrating a sound field distribution of a sound pressure level at a mid-low frequency of the acoustic device shown in FIG. 1.

FIG. 2A is a schematic diagram illustrating a sound field distribution of a sound pressure level at a mid-low frequency of the acoustic device 100 shown in FIG. 1. As shown in FIG. 2A, in a mid-low-frequency range (e.g., 50 Hz-1 kHz), the sound field distribution of the acoustic device 100 may show a good dipole direction, and a dipole sound leakage reduction effect may be significant. That is, in the mid-low-frequency range, the dipole sound sources including the first acoustic hole 111 and the second acoustic hole 112 of the acoustic device 100 may output sound waves with opposite phases or approximatively opposite phases. According to a principle of sound wave cancellation, the two sound waves may cancel each other in a far field, thereby reducing the sound leakage in the far field.

Figure 2B:
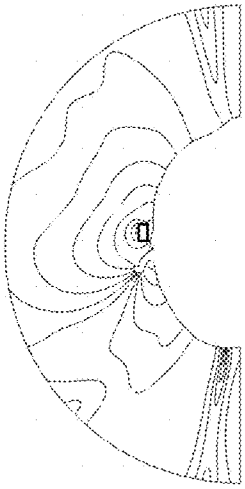
FIG. 2B is a schematic diagram illustrating a sound field distribution of a sound pressure level at a high frequency of the acoustic device shown in FIG. 1.

FIG. 2B is a schematic diagram illustrating a sound field distribution of a sound pressure level at a high frequency of the acoustic device 100 shown in FIG. 1. As shown in FIG. 2B, the sound field distribution of the acoustic device 100 may be more chaotic in a relatively high-frequency range.

In some embodiments, wavelengths of the first sound wave and the second sound wave in the relatively high-frequency range (e.g., 1500 Hz-20 kHz) may be shorter than wavelengths of the first sound wave and the second sound wave in a mid-low-frequency range. At this time, a distance between dipole sound sources including the first acoustic hole 111 and the second acoustic hole 112 may be negligible compared to the wavelengths of the first sound wave and the second sound wave in the relatively high-frequency range, which may result in that the sound waves emitted by the two sound sources cannot cancel each other, make it difficult to ensure the sound leakage reduction effect of the acoustic device in the far field in the relatively high-frequency range, or even increase the sound leakage, and make the sound field distribution of the acoustic device more chaotic. Merely by way of example, the distance between the first acoustic hole 111 and the second acoustic hole 112 may make the first sound wave and the second sound wave have different sound paths from a certain spatial point (e.g., the far field), so that the first sound wave and the second sound wave may have a relatively small phase difference (e.g., a phase of the first sound wave may be the same or close to a phase of the sound wave) at the spatial point, which may result in that the first sound wave and the second sound wave cannot interfere and cancel each other at the spatial point and may also be superimposed at the spatial point, thereby increasing an amplitude of the sound wave at the spatial point and increasing the sound leakage.

In some embodiments, sound waves emitted from the front side and/or the rear side of the speaker 120 may first pass through an acoustic transmission structure and radiate outwardly from the first acoustic hole 111 and/or the second acoustic hole 112. The acoustic transmission structure refers to an acoustic path through which the sound waves radiate from the speaker 120 to an external environment. In some embodiments, the acoustic transmission structure may include the housing 110 between the speaker 120 and the first acoustic hole 111 and/or the second acoustic hole 112. In some embodiments, the acoustic transmission structure may include an acoustic cavity. The acoustic cavity may be an amplitude space reserved for a diaphragm (not shown) of the speaker 120. For example, the acoustic cavity may include a cavity formed between the diaphragm of the speaker 120 and the housing 110. As another example, the acoustic cavity may also include a cavity formed between the diaphragm of the speaker 120 and a drive system (e.g., a magnetic circuit assembly). In some embodiments, the acoustic transmission structure may be acoustically communicated with the first acoustic hole 111 and/or the second acoustic hole 112, and the first acoustic hole 111 and/or the second acoustic hole 112 may also serve as a portion of the acoustic transmission structure. In some embodiments, when the speaker 120 is far from an opening of an ear canal, or when a radiation direction of the sound wave generated by the speaker 120 is not directed as expected to or away from the opening of the ear canal, the sound wave may be guided to an expected position through a sound guide tube and radiated to the external environment using the first acoustic hole 111 and/or the second acoustic hole 112. In such cases, the acoustic transmission structure may also include the sound guide tube.

In some embodiments, the acoustic transmission structure may have a resonant frequency, and the acoustic transmission structure may resonate when a frequency of the sound wave generated by the speaker 120 is near the resonant frequency. Under the action of the acoustic transmission structure, the sound wave in the acoustic transmission structure may also resonate, and the resonance may change a frequency component of the transmitted sound wave (e.g., adding an additional resonant peak to the transmitted sound wave), or change a phase of the transmitted sound wave in the acoustic transmission structure. Compared with when no resonance occurs, the phase and/or an amplitude of the sound wave radiated from the first acoustic hole 111 and/or the second acoustic hole 112 may change. The change of the phase and/or amplitude may make the sound field of the dipole structure near the resonant frequency chaotic, which may affect the effect of interference cancellation of the sound waves radiated from the first acoustic hole 111 and the second acoustic hole 112 at the spatial point. For example, when resonance occurs, the phase difference between the sound waves radiated from the first acoustic hole 111 and the second acoustic hole 112 may change. For example, when the phase difference between the sound waves radiated from the first acoustic hole 111 and the second acoustic hole 112 is relatively small (e.g., smaller than 120°, smaller than 90°, 0, etc.), the effect of the interference cancellation of the sound waves at the spatial point may be weakened, making it difficult to reduce the sound leakage; alternatively, the sound waves with a relatively small phase difference may also be superimposed on each other at the spatial point, which may increase the amplitude of the sound wave at the spatial point (e.g., far field) near the resonant frequency, thereby increasing the sound leakage of the acoustic device 100 in the far field. As yet another example, the resonance may increase the amplitude of the transmitted sound wave near the resonant frequency of the acoustic transmission structure (e.g., it may be manifested as a resonant peak near the resonant frequency), which may make the sound field of the dipole structure near the resonant frequency chaotic, and at this time, a difference between the amplitudes of the sound waves radiated from the first acoustic hole 111 and the second acoustic hole 112 may be relatively large, the effect of the interference cancellation of the sound waves at the spatial point may be weakened, making it difficult to reduce the sound leakage. In some embodiments, parameters such as volumes of the first acoustic cavity 130 and the second acoustic cavity 140 of the acoustic device, sizes and heights of the first acoustic hole 111 and the second acoustic hole 112, etc. may be different, which may result in inconsistent resonant frequencies of the first acoustic cavity and the second acoustic cavity (which may also be referred to as acoustic cavities), i.e., result in different resonant frequencies of the acoustic transmission structures on the front side and the rear side of the acoustic device. In some embodiments, an effect of a structure such as an auricle 210 on occlusion of high-frequency sound waves and/or reflection of sound waves may also make the sound field distribution of the acoustic device 100 chaotic.

Since the first acoustic hole 111 faces the opening of the ear canal of the user and the second acoustic hole 112 is far away from the opening of the ear canal with respect to the first acoustic hole 111, among the sound waves radiated outwardly by the acoustic device, the sound waves radiated outwardly through the second acoustic hole 112 account for the majority. That is, the sound waves radiated outwardly by the second acoustic hole 112 of the acoustic device 100 may dominate the chaotic sound field distribution. Accordingly, the structure of the acoustic device 100 may be adjusted to reduce an output of the second acoustic cavity in a target frequency range (e.g., including the resonant frequency of the acoustic transmission structure and a high-frequency range) without affecting the low-frequency output of the second acoustic cavity, thereby achieving the sound leakage reduction effect in the far field.

Figure 3:
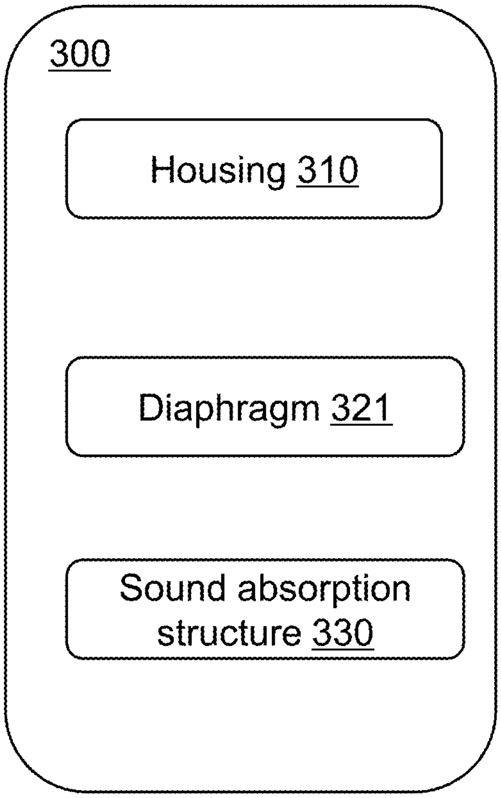
FIG. 3 is a block diagram illustrating an exemplary acoustic device according to some embodiments of the present disclosure.

FIG. 3 is a block diagram illustrating an exemplary acoustic device according to some embodiments of the present disclosure. In some embodiments, as shown in FIG. 3, the acoustic device 300 may include a housing 310, a diaphragm 321, and a sound absorption structure 330.

The housing 310 may be a regular or irregular three-dimensional structure with an internal accommodation cavity. For example, the housing 310 may be a hollow frame structure including, but not limited to, a regular shape such as a rectangular frame, a circular frame or a regular polygonal frame, and any irregular shape such as a runway shape. The housing 310 may be configured to accommodate a speaker and the sound absorption structure 330. In some embodiments, the housing 310 may be made of metal (e.g., stainless steel, copper, etc.), plastic (e.g., polyethylene (PE), polypropylene (PP), polyvinyl chloride (PVC), polystyrene (PS), acrylonitrile-butadiene-styrene copolymers (ABS), etc.), composite materials (e.g., metal matrix composites or non-metal matrix composites), epoxy resins, phenolics, ceramics, polyimides, glass fibers (e.g., FR4-glass fibers), or the like, or any combination thereof. The housing 310 may also be provided with a first acoustic hole 111 and a second acoustic hole 112 configured to output sound waves, and the speaker 120 may output the sound waves with a phase difference through the first acoustic hole 111 and the second acoustic hole 112.

The speaker may be a component configured to receive an electrical signal and convert the electrical signal into a sound signal for output. In some embodiments, divided according to a frequency of the speaker, a type of the speaker may include a speaker of a low frequency (e.g., 30 Hz-150 Hz), a speaker of a mid-low frequency (e.g., 150 Hz-500 Hz), a speaker of a mid-high frequency (e.g., 500 Hz-5 kHz), a speaker of a high frequency (e.g., 5 kHz-16 kHz), a speaker of a full frequency (e.g., 30 Hz-16 kHz), or any combination thereof. The low frequency, the high frequency, etc. mentioned here may be merely used to indicate an approximate range of the frequency. In different application scenarios, the frequency may be divided in different manners. For example, a frequency division point may be determined. The low frequency may indicate a frequency range that is smaller than the frequency division point, and the high frequency may indicate a frequency range that is greater than the frequency division point. The frequency division point may be any value within an audible range that can be heard by the ear of the user, for example, 500 Hz, 600 Hz, 700 Hz, 800 Hz, 1000 Hz, etc.

In some embodiments, the speaker may include the diaphragm 321, and the speaker including the diaphragm 321 may separate the accommodation cavity of the housing 310 into a first acoustic cavity and a second acoustic cavity. The diaphragm 321 may be an elastic thin film structure. In some embodiments, a material of the diaphragm 321 may include, but is not limited to, polyimide (PI), polyethylene terephthalate (PET), polyethyleneimine (PEI), polyetheretherketone (PEEK), silicone, polycarbonate (PC), vinyl polymer (PVC), acrylonitrile-butadiene-styrene copolymer (ABS), polyethylene (PE), poly-p-xylene (PPX), etc., or a multilayer composite material composed of the above materials. In some embodiments, the first acoustic cavity may be acoustically coupled with the first acoustic hole. The second acoustic cavity may be acoustically coupled with the second acoustic hole. When the diaphragm 321 vibrates, the sound waves may be radiated toward a front side and a rear side of the diaphragm 321, respectively. The front side of the diaphragm 321 refers to a side away from a drive system (e.g., a magnetic circuit assembly) of the diaphragm 321. The rear side of the diaphragm 321 refers to a side facing the drive system (e.g., the magnetic circuit assembly) of the diaphragm 321. The sound waves on the front side of the diaphragm 321 may be emitted from the first acoustic hole through the first acoustic cavity, and the sound wave on the rear side of the diaphragm 321 may be emitted from the second acoustic hole through the second acoustic cavity. It should be known that when the diaphragm 321 vibrates, the front side and the rear side of the diaphragm 321 may simultaneously generate a set of sound waves with a phase difference.

In some embodiments, the set of sound waves with the phase difference may be simultaneously generated on the front side and the rear side of the diaphragm 321 and respectively emitted from the first acoustic hole through the first acoustic cavity and from the second acoustic hole through the second acoustic cavity. The two sound waves may be superimposed and cancel at a certain spatial point (e.g., the far field) outside of the acoustic device, which may reduce the sound leakage in the far field of the acoustic device. The first acoustic hole 111 and the second acoustic hole 112 through which the sound waves are output may form dipole sound sources. When positions, a phase difference, etc. between the dipole sound sources satisfy a certain condition, the acoustic device may show different sound effects in the near field and the far field. For example, when point sound sources corresponding to the two acoustic holes have opposite phases and have a same amplitude or similar amplitudes, i.e., when an absolute value of the phase difference between the two point sound sources is 180° or close to 180°, the sound leakage in the far field may be reduced according to the principle of the anti-phase cancellation of the sound waves. As another example, when the phases of the two point sources corresponding to the two acoustic holes are approximately opposite, the sound leakage reduction in the far field may also be realized. Merely by way of example, the absolute value of the phase difference between the two point sources for achieving the sound leakage reduction in the far field may be in a range of 120°-240°.

According to the depictions of FIG. 1-FIG. 2B, the sound field of the dipole may be chaotic in the high-frequency range, have a poor sound leakage reduction effect, and even increase the sound leakage in some cases. To improve the sound leakage reduction effect of the acoustic device in the high-frequency range, the sound absorption structure 330 may be disposed in the second acoustic cavity of the acoustic device, and the sound absorption structure 330 may absorb the sound waves in the target frequency range of the second acoustic cavity to reduce or avoid superposition of the first sound wave and the second sound wave at the spatial point (e.g., the far field) outside the acoustic device, which may reduce the amplitude of the sound wave in the target frequency range at the spatial point, adjust the directivity of the acoustic output device, and achieve the sound leakage reduction effect in the far field.

The sound absorption structure 330 refers to a structure that has an absorption effect on the sound waves in a specific frequency band (e.g., in the target frequency range). The sound absorption structure 330 may be coupled with the second acoustic cavity and may be configured to absorb the sound radiated to the second acoustic hole through the second acoustic cavity in the target frequency range. Accordingly, in the target frequency range, a sound pressure level at the second acoustic hole when the sound absorption structure 330 is not disposed may be greater than a sound pressure level at the second acoustic hole when the sound absorption structure 330 is disposed.

In some embodiments, the target frequency range may include a frequency range near a resonant frequency of the second acoustic cavity. The sound absorption structure 330 may absorb the sound wave near the resonant frequency of the second acoustic cavity to avoid a change of a phase and/or an amplitude of the second sound wave caused by the resonance of the second acoustic cavity near the resonant frequency, thereby reducing the amplitude of the sound wave near the resonant frequency and reducing the sound leakage. In some embodiments, the resonant frequency may occur in a mid-high-frequency band, e.g., 2 kHz-8 kHz. Accordingly, the target frequency range may include a frequency in the mid-high-frequency band. For example, the target frequency range may be in a range of 1 kHz-10 kHz. In some embodiments, in a relatively high-frequency range, since the distance between the dipole sound sources including the first acoustic hole and the second acoustic hole is not negligible relative to the wavelength, the first sound wave and the second sound wave may not interfere and cancel at the spatial point and may be superimposed at the spatial point, which may increase the amplitude of the sound wave at the spatial point. In some embodiments, to reduce the increased amplitude of the sound wave due to the superposition of the first sound wave and the second sound wave in the relatively high-frequency range, the target frequency range may also include a frequency greater than the resonant frequency. In such cases, the sound absorption structure may absorb the sound waves in the relatively high-frequency range to reduce or avoid the superposition of the first and second sound waves at the spatial point, thereby reducing the amplitude of the sound wave in the target frequency range at the spatial point. For example, the target frequency range may be in a range of 1 kHz-20 kHz. It should be noted that the resonant frequency of the second acoustic cavity may be obtained in various test manners. For example, to test a frequency response curve of the second acoustic cavity when the sound absorption structure 330 is not disposed or removed, the first acoustic hole is kept open, the frequency response curve of the second acoustic hole is test using a microphone device (e.g., the microphone device is disposed at 2 mm-5 mm in front of the second acoustic hole), and the resonant frequency corresponding to the resonant peak on the frequency response curve may be obtained. The specific manner for testing the frequency response curve of the second acoustic cavity when the sound absorption structure 330 is not disposed or removed may be seen in FIG. 18 and descriptions thereof.

In some embodiments, the sound absorption structure (e.g., a position or a sound absorption frequency of the sound absorption structure) may be configured such that the acoustic device may have different sound effects at the spatial point. In some embodiments, the resonance of the first acoustic cavity may also affect sound wave radiation of the second acoustic cavity, and an additional resonant peak may be generated on the frequency response curve measured at the position of the second acoustic hole. Therefore, to avoid adding the additional resonant peak in the sound wave transmitted by the second acoustic cavity due to the resonance of the first acoustic cavity, the target frequency range may also include a resonant frequency of the first acoustic cavity. In some embodiments, another sound absorption structure 330 may also be disposed in the first acoustic cavity and may be configured to absorb the sound wave near the resonant frequency of the first acoustic cavity to avoid interference enhancement between the sound wave near the resonant frequency of the first acoustic cavity and the sound wave in a same frequency range output by the second acoustic hole at the spatial point, thereby reducing the amplitude of the sound wave near the resonant frequency of the first acoustic cavity received at the spatial point. In some embodiments, the sound absorption structure may also be disposed in both the first acoustic cavity and the second acoustic cavity, so that the sound waves near the resonant frequency of the first sound wave and the resonant frequency of the second sound wave may be absorbed, thereby reducing the amplitude of the sound wave at any spatial point more effectively. In some embodiments, the sound absorption structure may also absorb a low-frequency sound in a specific frequency range. For example, the sound absorption structure may be disposed in the second acoustic cavity to reduce the low-frequency sound of the specific frequency range output by the second acoustic hole to avoid the interference cancellation between the low-frequency sound in the specific frequency range and a low-frequency sound of a same frequency range output by the first acoustic hole at a spatial point (e.g., the near field), thereby increasing a volume of the acoustic device in the near field (i.e., transmitted to the ear of the user) in the specific frequency range. In some embodiments, the sound absorption structure may also include sub-absorbing structures that absorb different frequency ranges (e.g., a mid-high-frequency band and a low-frequency band), respectively. The sub-absorbing structures may be configured to absorb sounds in the different frequency ranges.

In some embodiments, since a wavelength of a high-frequency sound wave in a high-frequency range greater than the resonant frequency of the second acoustic cavity is relatively short, a distance (e.g., a distance between geometric centers of the two acoustic holes) between the two acoustic holes may affect a phase difference between the sound waves radiated by the two acoustic holes at the spatial point, which may weaken the sound leakage reduction effect of the dipole sound sources formed by the two acoustic holes in the high-frequency range. Therefore, to reduce the high-frequency output of the second acoustic cavity, the target frequency range may include the high-frequency range greater than the resonant frequency of the second acoustic cavity, so that the sound absorption structure 330 may absorb the high-frequency sound wave, thereby improving the sound leakage reduction effect of the dipole sound sources in the high-frequency range.

Since a human ear is relatively sensitive to a sound of 3 kHz-6 kHz in a relatively high-frequency range near the resonant frequency, in some embodiments, the target frequency range may include a frequency range of 3 kHz-6 kHz to achieve a more targeted and effective sound leakage reduction. In some embodiments, the target frequency range may include 4 kHz-6 kHz. In some embodiments, the target frequency range may include 5 kHz-6 kHz. It should be noted that the resonant frequency herein mainly refers to the resonant frequency of the second acoustic cavity, and in some embodiments, may also refer to the resonant frequency of the second acoustic cavity or the resonant frequency of the first acoustic cavity, hereinafter referred to as the resonant frequency.

According to the above embodiments, the sound absorption structure may absorb the sound wave in the target frequency range of the first sound wave and/or the second sound wave, thereby reducing the amplitude of the sound wave in the target frequency range at the spatial point. For the first sound wave and the second sound wave outside of the target frequency range (e.g., a sound wave smaller than the resonant frequency), the first sound wave and the second sound wave may be transmitted to the spatial point through the acoustic transmission structure and may interfere at the spatial point. The interference may reduce the amplitude of the sound wave outside the target frequency range at the spatial point. That is, the first sound wave and the second sound wave outside the target frequency range (or referred to as the first frequency range) may interfere and cancel at the spatial point, which may achieve the sound leakage reduction effect of the dipole; the first sound wave and/or the second sound wave in the target frequency range (or referred to as the second frequency range) may be absorbed by the sound absorption structure, so that the interference enhancement of the first sound wave and/or the second sound wave at the spatial point may be reduced or avoided, or the additional resonant peak generated by the first sound wave or the second sound wave under the action of the acoustic transmission structure may be weakened or absorbed, thereby reducing the amplitude of the sound wave in the target frequency range at the spatial point. As a result, in the embodiments of the present disclosure, the sound absorption structure may be configured such that the acoustic device outputs the first sound wave and the second sound wave in the first frequency range and sound wave output by the acoustic device (e.g., the second acoustic hole) near the resonant frequency of the acoustic transmission structure or greater than the resonant frequency is reduced, which may reduce or avoid an increase in the amplitude of the sound wave at the spatial point (e.g., far field) in the second frequency range while ensuring that the sound waves output by the acoustic device interfere and cancel each other in the first frequency range. In such cases, the directivity of the acoustic device may be adjusted to ensure a sound leakage reduction effect in a full-frequency range.

A sound absorption effect of the sound absorption structure 330 refers to an amount of sound that the sound absorption structure 330 is capable of absorbing in the target frequency range, which may be expressed by the sound pressure level. For example, the sound absorption effect of the sound absorption structure 330 may be expressed as a difference between sound pressure levels respectively measured at a same frequency and at a same position corresponding to the second acoustic cavity with and without the sound absorption structure 330 in the target frequency range. Merely by way of example, the difference between the sound pressure levels at the second acoustic hole of the acoustic device with and without the sound absorption structure 330 may be used to express a difference between the sound pressure levels of the second acoustic cavity of the acoustic device with and without the sound absorption structure 330. Merely by way of example, the sound pressure levels at the second acoustic hole of the acoustic device with and without the sound absorption structure 330 may be measured as follows. The sound pressure levels at the second acoustic hole with and without the sound absorption structure 330 is tested by placing a test microphone directly in front of the second acoustic cavity at a distance of about 2 mm-5 mm. A test frequency may be near the resonant frequency of the second acoustic cavity or near 1 kHz. In some embodiments, the difference between the sound pressure levels measured at the same frequency and at the same position in the second acoustic cavity of the acoustic device with and without the sound absorption structure 330 may be greater than or equal to 3 dB. For example, the difference between sound pressure levels at the second acoustic hole of the acoustic device with and without sound absorption structure 330 measured at the same frequency may be greater than or equal to 3 dB. In some embodiments, the target frequency range described above may be referred to as a sound absorption bandwidth of the sound absorption structure 330. When the sound absorption bandwidth is in a range of 3 kHz-6 kHz, the sound absorption structure 330 may effectively absorb a sound wave in the range of 3 kHz-6 kHz with the sound absorption effect of greater than or equal to 3 dB, which may reduce the sound leakage of the acoustic device in the range of 3 kHz-6 kHz. In some embodiments, to further reduce the sound leakage of the acoustic device, the sound absorption effect of the sound absorption structure 330 may be greater than or equal to 5 dB in the target frequency range. In some embodiments, to further reduce the sound leakage of the acoustic device, the sound absorption effect of the sound absorption structure 330 may be greater than or equal to 6 dB in the target frequency range. In some embodiments, to further reduce the sound leakage of the acoustic device, the sound absorption effect of the sound absorption structure 330 may be greater than or equal to 8 dB in the target frequency range. In some embodiments, to further reduce the sound leakage of the acoustic device, the sound absorption effect of the sound absorption structure 330 may be greater than or equal to 10 dB in the target frequency range. For example, in different frequency ranges, the sound absorption effects of the sound absorption structure 330 may be different. For example, in the range of 3 kHz-6 kHz, the sound absorption effect of the sound absorption structure 330 may be greater than or equal to 3 dB. As another example, in the range of 4 kHz-6 kHz, the sound absorption effect of the sound absorption structure 330 may be greater than or equal to 6 dB. As a further example, in the range of 5 kHz-6 kHz range, the sound absorption effect of the sound absorption structure 330 may be greater than or equal to 8 dB, which may reduce the sound leakage more effectively in a relatively high-frequency range.

The frequency response curve of the second acoustic cavity may have a resonant peak at a specific frequency (e.g., a resonant frequency), and a vibration amplitude at the resonant frequency may be relatively large. To obtain a relatively good sound leakage reduction effect at the resonant frequency of the second acoustic cavity, the sound absorption structure 330 may need to absorb more sounds at the resonant frequency. Therefore, in some embodiments, the sound absorption structure 330 may have a sound absorption effect of greater than or equal to 14 dB on the sound at the resonant frequency or the sound at the vibration frequency close to the resonant frequency. In this way, the sound wave at or near the resonant frequency of the second acoustic cavity may be effectively absorbed by the sound absorption structure 330, which may reduce or avoid resonance of the sound wave near the resonant frequency under the action of the acoustic cavity, thereby reducing or avoiding the case in which the sound leakage reduction effect at the spatial point is weakened or even a case in which the two sounds not only do not cancel but also interfere with and enhance each other at the spatial point caused by changes of the amplitude difference and phase difference (e.g., the phase difference is not equal to 180°) between the first sound wave and the second sound wave near the resonant frequency resulting, and reducing the sound leakage of the acoustic device in the far field. In some embodiments, to further reduce the sound leakage of the acoustic device, the sound absorption structure 330 may have the sound absorption effect of greater than or equal to 16 dB on the sound at the resonant frequency or the sound at the vibration frequency close to the resonant frequency. In some embodiments, to further reduce the sound leakage of the acoustic device, the sound absorption structure 330 may have the sound absorption effect of greater than or equal to 18 dB on the sound at the resonant frequency or the sound at the vibration frequency close the resonant frequency. In some embodiments, to further reduce the sound leakage of the acoustic device, the sound absorption structure 330 may have the sound absorption effect of greater than or equal to 20 dB on the sound at the resonant frequency or the sound at the vibration frequency close the resonant frequency. In some embodiments, to further reduce the sound leakage of the acoustic device, the sound absorption structure 330 may have the sound absorption effect of greater than or equal to 22 dB on the sound at the resonant frequency or the sound at the vibration frequency close to the resonant frequency. In some embodiments, to further reduce the sound leakage of the acoustic device, the sound absorption structure 330 may have the sound absorption effect of greater than or equal to 25 dB on the sound at the resonant frequency or the sound at the vibration frequency close to the resonant frequency.

In some embodiments, the sound absorption structure 330 may include at least one of a resistive sound absorption structure or a reactive sound absorption structure. For example, a function of the sound absorption structure 330 may be realized by the resistive sound absorption structure. As another example, the function of the sound absorption structure 330 may be realized by the reactive sound absorption structure. As yet another example, the function of the sound absorption structure 330 may be realized by a resistive and reactive sound absorption structure.

The resistive sound absorption structure refers to a structure that provides an acoustic resistance when the sound wave passes through. In some embodiments, the resistive sound absorption structure may include at least one of a porous sound absorption material or an acoustic gauze mesh. In some embodiments, the resistive sound absorption structure may be disposed at any position on a transmission path of the first sound wave and/or the second sound wave. For example, the porous sound absorption material or the acoustic gauze mesh may be attached to an inner wall of the acoustic transmission structure. As another example, the porous sound absorption material or the acoustic gauze mesh may form at least one portion of the inner wall of the acoustic transmission structure. As another example, the porous sound absorption material or the acoustic gauze mesh may fill at least one portion of an interior of the acoustic transmission structure. The reactive sound absorption structure refers to a structure that absorbs the sound based on resonance. In some embodiments, the reactive sound absorption structure may include, but is not limited to, a Helmholtz acoustic cavity, a perforated plate sound absorption structure, a micro-perforated plate sound absorption structure, a thin plate, a thin membrane, a ¼-wavelength resonant tube, or the like, or any combination thereof. In some embodiments, both the resistive sound absorption structure and the reactive sound absorption structure may be disposed as a resistive and reactive sound absorption structure to realize the function of the sound absorption structure 330. For example, the resistive and reactive sound absorption structure may include the perforated plate sound absorption structure and the porous sound absorption material or the acoustic gauze mesh. The porous sound absorption material or the acoustic gauze mesh may be disposed inside a cavity of the perforated plate sound absorption structure or may be provided inside the acoustic transmission structure. As another example, the resistive and reactive sound absorption structure may include the ¼-wavelength resonant tube structure and the porous sound absorption material or the acoustic gauze mesh. The ¼-wavelength resonant tube structure may be disposed inside or outside the acoustic transmission structure, and the porous sound absorption material or the acoustic gauze mesh may be disposed inside the acoustic transmission structure. As yet another example, the resistive and reactive sound absorption structure may include the perforated plate sound absorption structure, the ¼-wavelength resonant tube structure, and the porous sound absorption material or the acoustic gauze mesh.

Figure 4:
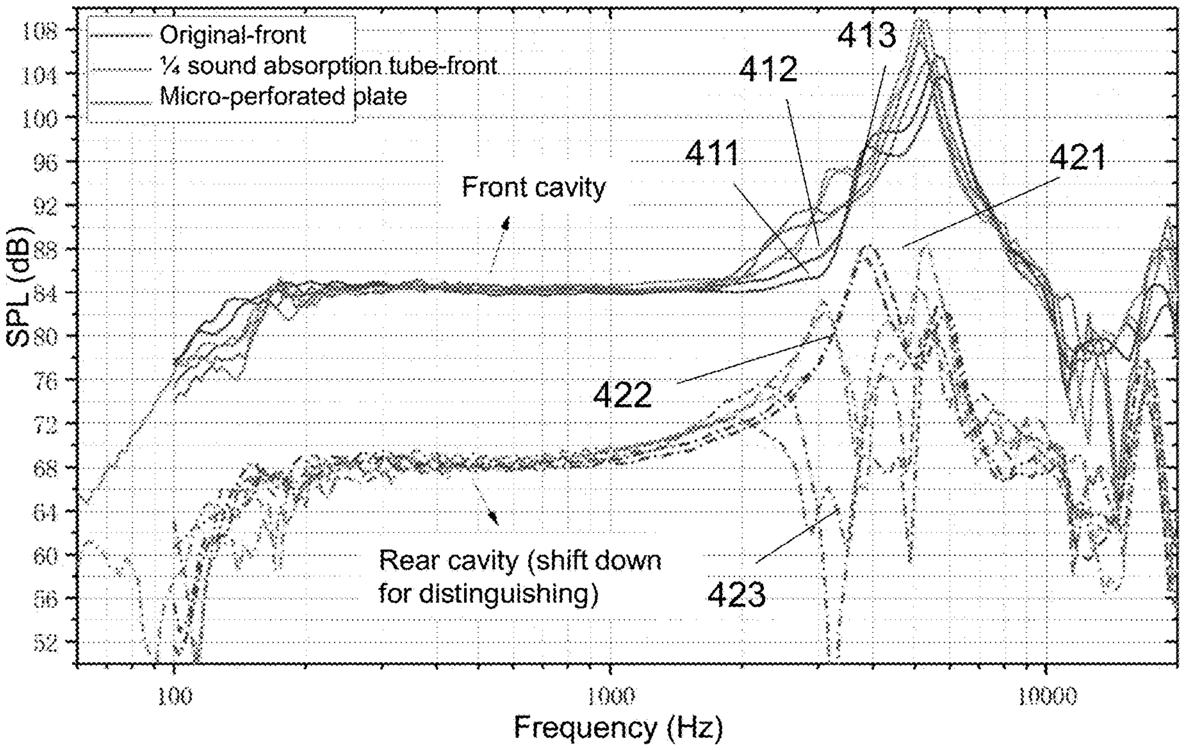
FIG. 4 is a graph illustrating frequency response curves of an acoustic device with different sound absorption structures according to some embodiments of the present disclosure.

FIG. 4 is a graph illustrating frequency response curves of an acoustic device with different sound absorption structures according to some embodiments of the present disclosure. The curves 411 and 421 respectively indicate the frequency response curves of a first acoustic cavity (e.g., the first acoustic cavity 130 shown in FIG. 1) and a second acoustic cavity (e.g., the second acoustic cavity 140) when the sound absorption structure is not disposed in the acoustic device; the curves 412 and 422 respectively indicate the frequency response curves of the first acoustic cavity and the second acoustic cavity when a ¼-wavelength resonant tube is disposed in the second acoustic cavity of the acoustic device; and the curves 413 and 423 respectively indicate the frequency response curves of the first acoustic cavity and the second acoustic cavity when a micro-perforated plate sound absorption structure is disposed in the second acoustic cavity of the acoustic device. As shown in FIG. 4, compared with the acoustic device without the sound absorption structure, the frequency response of the acoustic device with the sound absorption structure in the first acoustic cavity is not much different, the frequency response of the second acoustic cavity is also not much different in a low-frequency (e.g., smaller than 2 kHz) range, but the frequency response of the second acoustic cavity may form a valley in a high-frequency (e.g., greater than 2 kHz) range. That is, the sound absorption structure may reduce an amplitude of the high-frequency sound wave output by the second acoustic cavity, thereby reducing high-frequency sound leakage. Additionally, compared with the ¼-wavelength resonant tube, the acoustic device with the micro-perforated plate sound absorption structure may have a superior high-frequency sound leakage reduction effect.

In some embodiments, an acoustic transmission structure (e.g., a housing) of the acoustic device may include a perforated plate sound absorption structure and a resistive sound absorption structure. The resistive sound absorption structure may include a porous sound absorption material and/or an acoustic gauze mesh. In some embodiments, the resistive sound absorption structure may be disposed around openings of one or more holes of the perforated plate sound absorption structure. In some embodiments, the resistive and reactive sound absorption structure may be configured such that not only the sound may be absorbed through the resonance of the reactive sound absorption structure, but also frictional dissipation of the sound wave may be increased through the resistive sound absorption structure, thereby increasing a sound absorption bandwidth and further improving the sound leakage reduction effect in the target frequency range of the acoustic device. In some embodiments, the resistive sound absorption structure may be attached to an inner wall of a cavity of the perforated plate sound absorption structure. In some embodiments, the resistive sound absorption structure may fill at least one portion of the cavity. In some embodiments, the resistive sound absorption structure may also be disposed inside the housing or as a portion of the housing.

Figure 5:
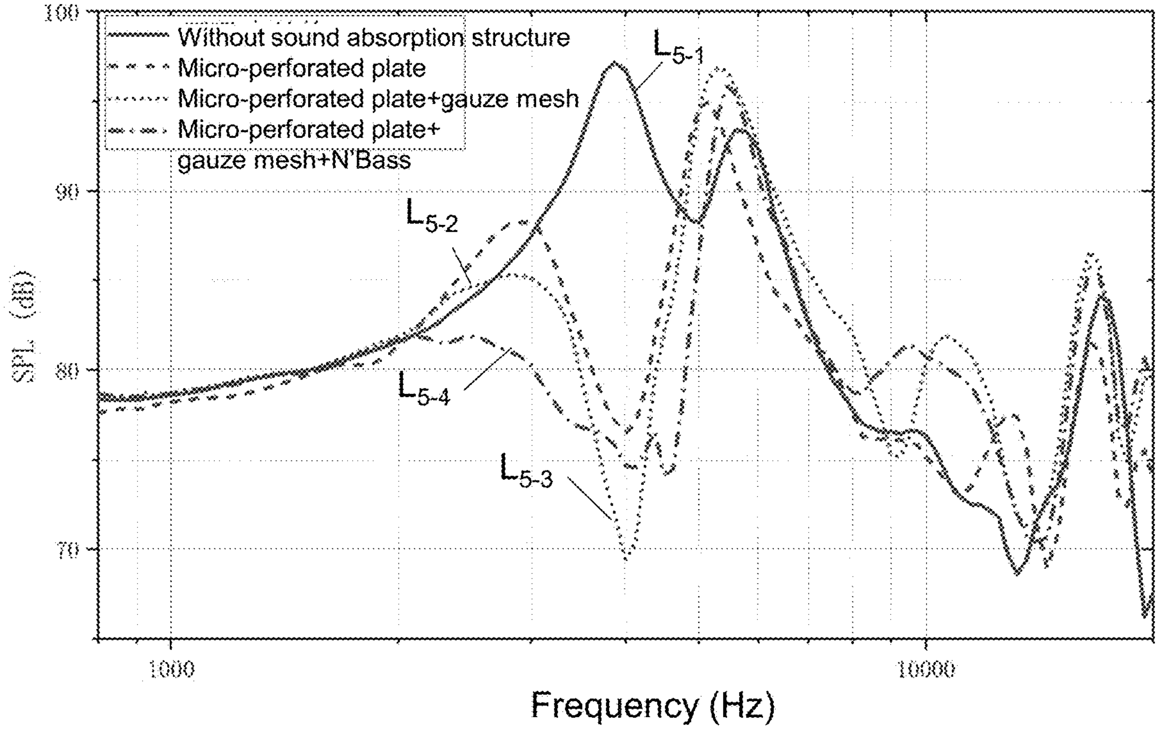
FIG. 5 is a graph illustrating frequency response curves of an acoustic device with different sound absorption structures according to some embodiments of the present disclosure.

FIG. 5 is a graph illustrating frequency response curves of an acoustic device with different sound absorption structures according to some embodiments of the present disclosure. As shown in FIG. 5, the curve $L_{5-1}$ indicates the frequency response curve of the second acoustic cavity of the acoustic device without a sound absorption structure, the curve $L_{5-2}$ indicates the frequency response curve of the second acoustic cavity of the acoustic device with a micro-perforated plate sound absorption structure, the curve $L_{5-3}$ indicates the frequency response curve of the second acoustic cavity of the acoustic device with the micro-perforated plate sound absorption structure and the acoustic gauze mesh, and the curve $L_{5-4}$ indicates the frequency response curve of the second acoustic cavity of the acoustic device with the micro-perforated plate sound absorption structure, the acoustic gauze mesh, and an N'Bass material. It may be seen from FIG. 5 that in the low-frequency range (e.g., 1 kHz-2 kHz), the four curves have a relatively high degree of overlap, which may indicate that the outputs of the acoustic devices with the four structures may be similar at the low frequency. In the mid-high frequency range (e.g., above 2 kHz), compared with $L_{5-1}$ corresponding to the acoustic device without the sound absorption structure, $L_{5-2}$, $L_{5-3}$, and $L_{5-4}$ corresponding to the acoustic devices with the sound absorption structures may form valleys. That is, the sound absorption structure may reduce the high-frequency output of the second acoustic cavity of the acoustic device, thereby improving the high-frequency sound leakage reduction effect. In a relatively great range (e.g., 2 kHz-5 kHz), the $L_{5-4}$ corresponding to the acoustic device with triple sound absorption structures may be basically below the other three curves and have an optimal sound leakage reduction effect. Therefore, the high-frequency output of the second acoustic cavity of the acoustic device may be reduced by configuring the sound absorption structure (e.g., the resistive and reactive sound absorption structure), thereby suppressing the chaotic sound field of the acoustic device in the high-frequency range and improving the high-frequency sound leakage reduction effect.

The sound absorption structure 330 may be coupled with the second acoustic cavity, and sound waves in a target frequency range may be absorbed by the sound absorption structure 330, which may reduce or avoid the resonance of the sound waves near a specific frequency (e.g., a resonant frequency) under the action of the acoustic cavity, thereby reducing or avoiding the case in which the sound leakage reduction effect at the spatial point is weakened or even a case in which the two sounds not only do not cancel but also interfere with and enhance each other at the spatial point caused by changes of amplitude difference and phase difference (e.g., a phase difference is not equal to 180°)

between the first sound wave and the second sound wave near the specific frequency of the cavity. The target frequency range may include a high-frequency range, and the first sound wave and the second sound wave outside the target frequency range may achieve dipole cancellation to reduce the sound leakage at the spatial point.

Figure 6:
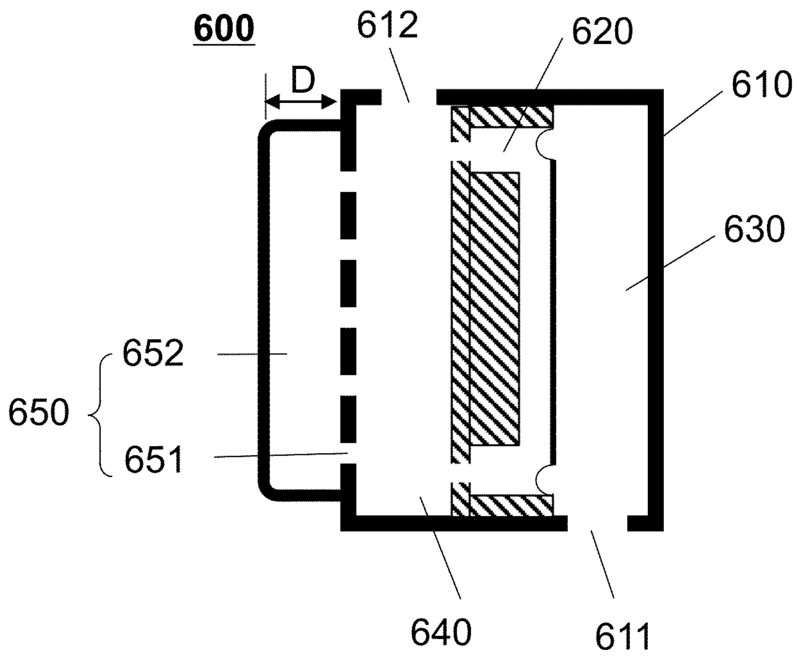
FIG. 6 is a schematic diagram illustrating an exemplary structure of an acoustic device with a sound absorption structure according to some embodiments of the present disclosure.

FIG. 6 is a schematic diagram illustrating an exemplary structure of an acoustic device with a sound absorption structure according to some embodiments of the present disclosure.

As shown in FIG. 6, in some embodiments, the acoustic device 600 may include a housing 610 and a speaker 620. The speaker 620 may be disposed in an accommodation cavity formed by the housing 610, and a first acoustic cavity 630 and a second acoustic cavity 640 may be disposed at a front side and a rear side of the speaker 620 (or a diaphragm), respectively. The housing 610 may be provided with a first acoustic hole 611 and a second acoustic hole 612. The first acoustic cavity 630 may be acoustically coupled with the first acoustic hole 611, and the second acoustic cavity 640 may be acoustically coupled with the second acoustic hole 612.

In some embodiments, as shown in FIG. 6, the acoustic device 600 may further include a sound absorption structure 65. The sound absorption structure 650 may be coupled with the second acoustic cavity 640. In some embodiments, the sound absorption structure 650 may include a micro-perforated plate sound absorption structure. The micro-perforated plate sound absorption structure may include a micro-perforated plate 651 and a cavity 652. The micro-perforated plate 651 may include at least one through hole. The second acoustic cavity 640 coupled with the micro-perforated plate structure may be in flow communication with the cavity 652 through the at least one through hole on the micro-perforated plate. It should be understood that the acoustic device 600 shown in FIG. 6 is merely provided for an exemplary illustration, and the specific manner in which the sound absorption structure 650 is disposed may have various variations or modifications.

A sound wave in the second acoustic cavity 640 may enter the cavity 652 of the micro-perforated plate sound absorption structure through the at least one through hole and cause resonance of the micro-perforated plate sound absorption structure under a certain condition. For example, when a vibration frequency of the sound wave entering the cavity 652 is close to a resonant frequency of the micro-perforated plate sound absorption structure, the sound wave entering the cavity 652 may cause the resonance of the micro-perforated plate sound absorption structure. Air in the cavity 652 may resonate with the micro-perforated plate sound absorption structure to dissipate energy, which may achieve a sound absorption effect. A frequency of the sound wave absorbed by the micro-perforated plate sound absorption structure may be the same as or close to the resonant frequency of the micro-perforated plate sound absorption structure.

In some embodiments, a material of the micro-perforated plate 651 may be metal (e.g., aluminum) or non-metal (e.g., acrylic, polycarbonate (PC), etc.). When the micro-perforated plate 651 is a non-metal plate, the non-metal plate may have a relatively small thermal conductivity coefficient, and a process of the sound wave passing through the at least one through hole may be considered an adiabatic process. When the micro-perforated plate 651 is a metal plate, the metal plate may have a relatively large thermal conductivity coefficient, and the process of the sound wave passing through the at least one through hole may be considered as an isothermal process when a hole diameter of the at least one through hole is small. The thermal conduction represents an enhancement of energy dissipation, so an equivalent damping of the metal plate may be greater than that of the non-metal plate.

Figure 7:
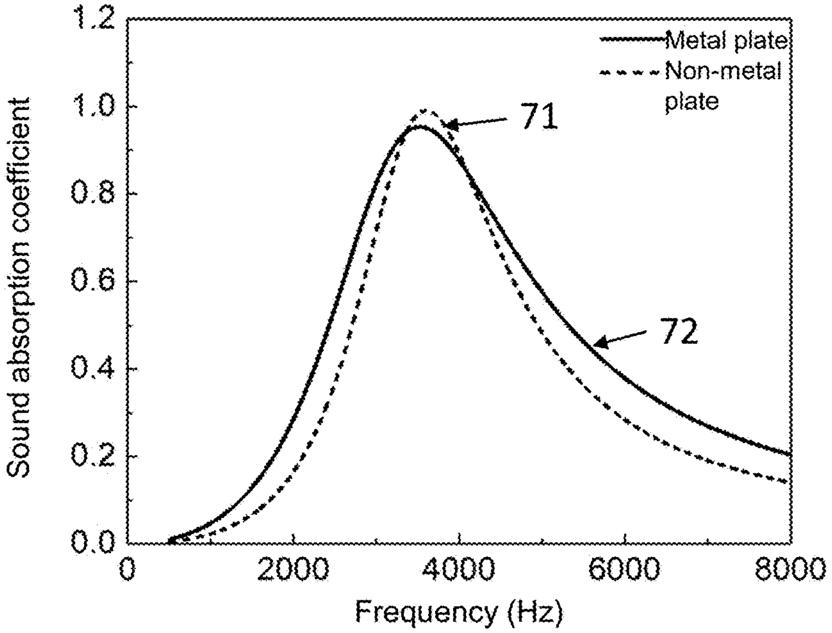
FIG. 7 is a diagram illustrating sound absorption effects of an acoustic device respectively using a metal micro-perforated plate and a non-metal micro-perforated plate according to some embodiments of the present disclosure.

FIG. 7 is a graph illustrating sound absorption effects of an acoustic device respectively using a metal micro-perforated plate and a non-metal micro-perforated plate according to some embodiments of the present disclosure. The horizontal axis in FIG. 7 indicates a sound absorption frequency, the vertical axis indicates a sound absorption coefficient, the curve 71 indicates the sound absorption effect corresponding to the non-metal micro-perforated plate, and the curve 72 indicates the sound absorption effect corresponding to the metal micro-perforated plate. As shown in FIG. 7, a maximum sound absorption coefficient corresponding to the metal micro-perforated plate is slightly lower than that corresponding to the non-metal micro-perforated plate, but a sound absorption bandwidth corresponding to the metal micro-perforated plate is wider than that corresponding to the non-metal micro-perforated plate due to a better thermal conductivity of the metal micro-perforated plate and a greater equivalent damping of the metal micro-perforated plate when the sound wave passes through.

Figure 8:
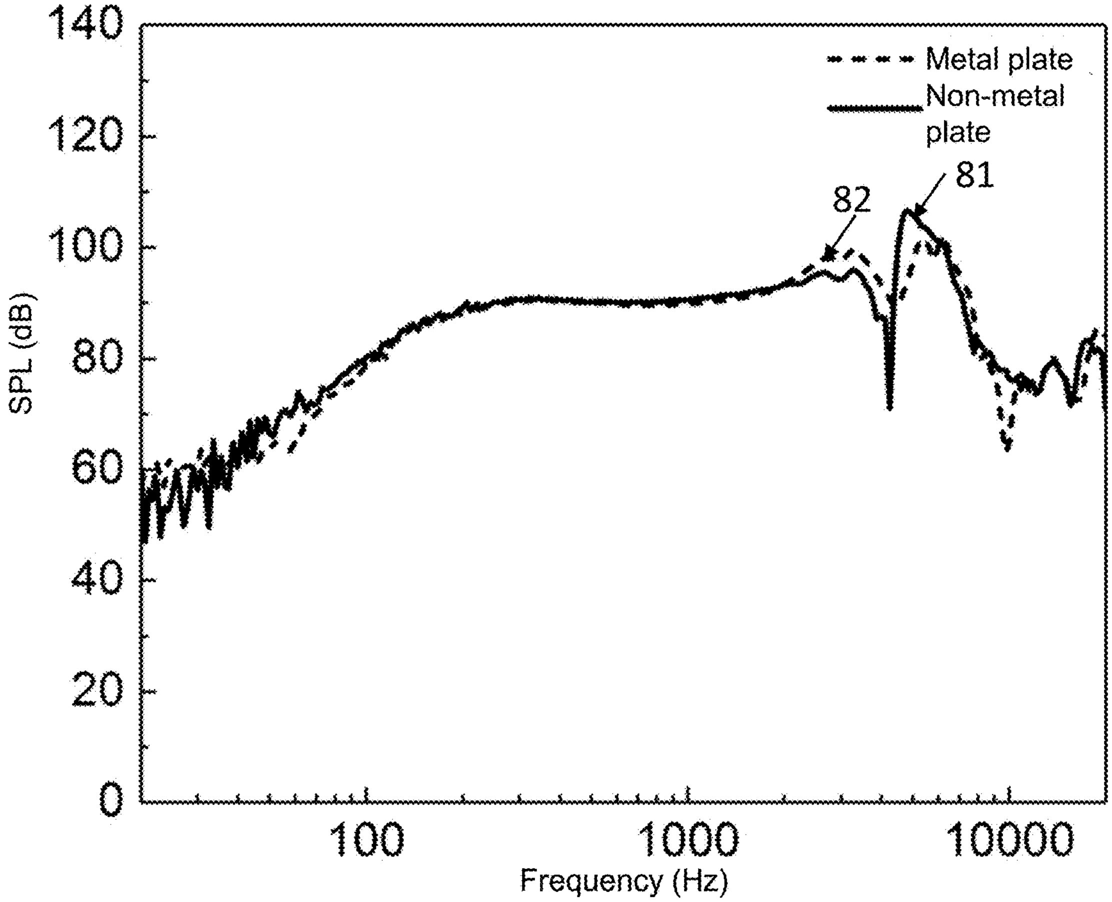
FIG. 8 is a graph illustrating frequency response curves of an acoustic device respectively using a metal micro-perforated plate and a non-metal micro-perforated plate according to some embodiments of the present disclosure.

FIG. 8 is a graph illustrating frequency response curves of an acoustic device respectively using a metal micro-perforated plate and a non-metal micro-perforated plate according to some embodiments of the present disclosure. The horizontal axis in FIG. 8 indicates a frequency, the vertical axis indicates a sound pressure level, the curve 81 indicates a frequency response corresponding to the metal micro-perforated plate, and the curve 82 indicates a frequency response corresponding to the non-metal micro-perforated plate. The frequency response refers to a frequency response at a second acoustic hole (e.g., 10 mm directly in front of the second acoustic hole). As shown in FIG. 8, compared with the non-metal micro-perforated plate, the acoustic device with the metal micro-perforated plate has a better sound absorption effect in a mid-low-frequency band (e.g., smaller than 4 kHz), and the sound leakage of the acoustic device is reduced by approximately 2 dB-3 dB, wherein the metal micro-perforated plate is an aluminum plate. Although the sound absorption effect of the non-metal micro-perforated plate is slightly worse, a weight of the acoustic device may be reduced when the non-metal micro-perforated plate is used, which is conducive to enhancing the portability of the acoustic device and reducing the cost of the acoustic device. In some embodiments, since the metal plate and the non-metal plate each have advantages, the metal micro-perforated plate or the non-metal micro-perforated plate may be flexibly selected based on various aspects such as weight, cost, or corrosion resistance.

If an intrinsic frequency of the micro-perforated plate 651 mounted in the acoustic device (or referred to as a fixed state) falls in the target frequency range, the micro-perforated plate 651 may resonate in the target frequency range, which may affect the sound absorption effect. Therefore, the intrinsic frequency of the micro-perforated plate 651 in the fixed state may need to be much greater than a target frequency. In some embodiments, the intrinsic frequency of the micro-perforated plate 651 in the fixed state may be not easy to measure, and the intrinsic frequency of the micro-perforated plate 651 in the fixed state may be characterized using an intrinsic frequency of the micro-perforated plate 651 in a free state. The free state refers to a state when the micro-perforated plate 651 is not mounted in the acoustic device, and the intrinsic frequency of the micro-perforated plate 651 in the fixed state may be much greater than the intrinsic frequency of the micro-perforated plate 651 in the free state. The intrinsic frequency in the free state may be measured as follows. The micro-perforated plate 651 is kept in the free state, an excitation force of a constant amplitude and a varying frequency from low to high is applied to the micro-perforated plate 651 through an exciter, a velocity amplitude of the micro-perforated plate 651 is tested using a laser vibrometer, and a frequency at which the velocity amplitude of the micro-perforated plate 651 first reaches a great value is recorded as the intrinsic frequency of the micro-perforated plate 651 in the free state. In some embodiments, a sound absorption bandwidth may be in a range of 3 kHz-6 kHz, and to avoid that the intrinsic frequency in the fixed state of the micro-perforated plate falls in the sound absorption bandwidth, a theoretical value of the intrinsic frequency of the micro-perforated plate 651 in the free state may be greater than 500 Hz (e.g., 500 Hz-3.6 kHz), which may make the intrinsic frequency in the fixed state much greater than an upper limit frequency of sound absorption (i.e., a maximum frequency in the sound absorption bandwidth, e.g., 6 kHz). The intrinsic frequency may be related to a stiffness of the micro-perforated plate 651 and a mass of the micro-perforated plate 651. In such cases, the intrinsic frequency may be determined by setting the stiffness of the micro-perforated plate 651 and/or the mass of the micro-perforated plate 651, so that the micro-perforated plate 651 may absorb a sound wave in the target frequency range. In some embodiments, the micro-perforated plate 651 of different shapes, materials, etc. may have different stiffnesses and/or masses, which may result in different intrinsic frequencies. In some embodiments, the micro-perforated plate 651 may be in a regular shape (e.g., a circle, a sector, a rectangle, or a rhombus) or an irregular shape. In some embodiments, the material of the micro-perforated plate 651 may be a non-metal or metal material.

In some embodiments, the micro-perforated plate 651 may include a runway-type micro-perforated plate. In some embodiments, when the micro-perforated plate 651 is the runway-type micro-perforated plate, to make the intrinsic frequency of the micro-perforated plate 651 in the free state in a range of 500 Hz-3.6 kHz, a Young's modulus of the material of the micro-perforated plate 651 may be in a range of 5 Gpa-200 Gpa. For example, the Young's modulus of the material of the micro-perforated plate 651 may be in a range of 10 Gpa-180 Gpa. As another example, the Young's modulus of the material of the micro-perforated plate 651 may be in a range of 20 Gpa-150 Gpa. As yet another example, the Young's modulus of the material of the micro-perforated plate 651 may be in a range of 50 Gpa-100 Gpa. In some embodiments, a plate thickness of the micro-perforated plate 651 may affect the intrinsic frequency of the micro-perforated plate 651. When the micro-perforated plate 651 is a runway-type micro-perforated plate, to make the intrinsic frequency of the micro-perforated plate 651 in the free state in the range of 500 Hz-3.6 kHz, the plate thickness of the runway-type micro-perforated plate may be in a range of 0.1 mm-0.8 mm. For example, the plate thickness of the runway-type micro-perforated plate may be in a range of 0.2 mm-0.7 mm. As another example, the plate thickness of the runway-type micro-perforated plate may be in a range of 0.3 mm-0.6 mm.

In some embodiments, the micro-perforated plate 651 may include a circular micro-perforated plate. With a same parameter (e.g., a hole diameter, the plate thickness, a perforation rate, and a height of a cavity (e.g., cavity 652)), the intrinsic frequency of the circular micro-perforated plate 651 may be lower than that of the runway-type micro-perforated plate 651. In such cases, compared with the runway-type micro-perforated plate, the circular micro-perforated plate may need to be made of a more rigid material and/or have a thicker plate thickness to ensure that the intrinsic frequency of the circular micro-perforated plate 651 is much greater than the upper limit frequency of sound absorption. In some embodiments, when the micro-perforated plate 651 is the circular micro-perforated plate, to make the intrinsic frequency of the micro-perforated plate 651 in the free state in the range of 500 Hz-3.6 kHz, the Young's modulus of the material of the micro-perforated plate 651 may be in a range of 50 Gpa-200 Gpa. For example, the Young's modulus of the material of the circular micro-perforated plate may be in a range of 60 Gpa-180 Gpa. As another example, the Young's modulus of the material of the circular micro-perforated plate may be in a range of 80 Gpa-150 Gpa. As yet another example, the Young's modulus of the material of the circular micro-perforated plate may be in a range of 100 Gpa-150 Gpa. In some embodiments, when the micro-perforated plate 651 is the circular perforated plate, to make the intrinsic frequency of the micro-perforated plate 651 in the free state in the range of 500 Hz-3.6 kHz, a plate thickness of the circular micro-perforated plate may be in a range of 0.3 mm-1 mm. For example, the plate thickness of the circular micro-perforated plate may be in a range of 0.4 mm-0.9 mm. As another example, the plate thickness of the circular micro-perforated plate may be in a range of 0.5 mm-0.8 mm. As another example, the plate thickness of the circular micro-perforated plate may be in a range of 0.6 mm-0.7 mm.

The intrinsic frequency of the micro-perforated plate 651 may be adjusted by setting the Young's modulus and/or the plate thickness of the micro-perforated plate 651, which may prevent the intrinsic frequency of the micro-perforated plate 651 in the fixed state from falling in the sound absorption bandwidth and affecting the sound absorption effect.

In some embodiments, a waterproof and breathable structure may be disposed on a side of the micro-perforated plate 651 facing the speaker 420 (or a diaphragm), and the waterproof and breathable structure may be configured for waterproofing and dustproofing. Specifically, since a hole diameter of the at least one through hole of the micro-perforated plate 651 is relatively small and prone to capillarity, it may be difficult to discharge water after the water enters the through hole, which may affect the sound leakage reduction effect of the sound absorption structure. Therefore, the waterproof and breathable structure may be disposed at an interface between the micro-perforated plate 651 and a second acoustic cavity 440. In some embodiments, the waterproof and breathable structure may cover an entire side of the micro-perforated plate 651 in contact with the second acoustic cavity 440. In some embodiments, the waterproof and breathable structure may cover all the through holes on the micro-perforated plate 651, so that the through holes may be in communication with the second acoustic cavity 440 through the waterproof and breathable structure.

Figure 9:
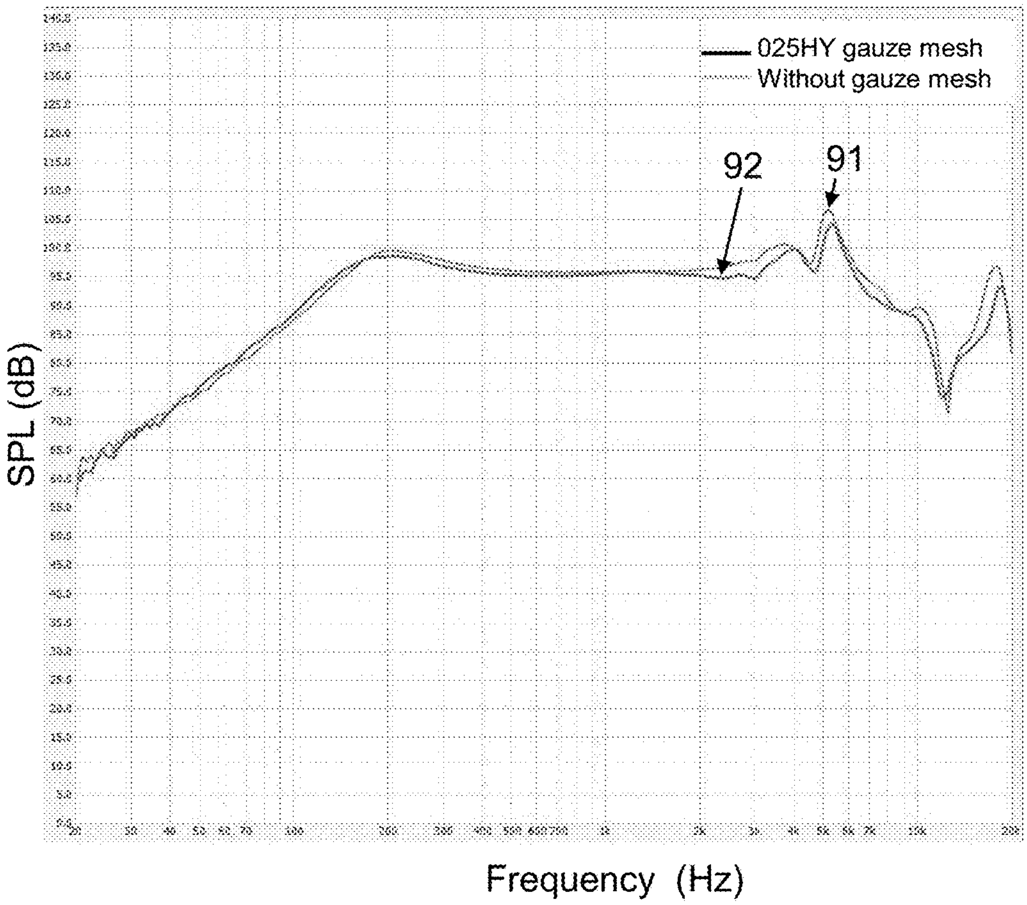
FIG. 9 is a graph illustrating frequency response curves measured at a second acoustic hole of an acoustic device with and without a 025HY-type gauze mesh disposed on a side of a micro-perforated plate facing a speaker (or a diaphragm) according to some embodiments of the present disclosure.

In some embodiments, the waterproof and breathable structure may be a gauze mesh. FIG. 9 is a graph illustrating frequency response curves measured at the second acoustic hole 612 of an acoustic device with and without a 025HY-type gauze mesh on a side of the micro-perforated plate 651 facing the speaker 120 (or a diaphragm) according to some embodiments of the present disclosure. In FIG. 9, the horizontal axis indicates a frequency, the vertical axis indicates a sound pressure level, the curve 91 indicates the frequency response curve measured at the second acoustic hole 612 (e.g., 10 mm directly in front of the second acoustic hole 612) of the acoustic device with the 025HY-type gauze mesh, and the curve 92 indicates the frequency response curve measured at the second acoustic hole 612 (e.g., 10 mm directly in front of the second acoustic hole 612) of the acoustic device without the gauze mesh. As shown in FIG. 9, the curve 91 is slightly higher than the curve 92, and sound pressure levels of the curve 91 and the curve 92 are not much different. It may be seen that the sound absorption effect of the micro-perforated plate 651 with the 025HY-type gauze mesh is slightly lower than that of the micro-perforated plate 651 without gauze mesh. That is, the 025HY-type gauze mesh has little impact on the sound absorption effect, but may play a role in waterproofing and dustproofing to a certain degree (e.g., an acoustic device with the 025HY-type gauze mesh may pass an IPX7 waterproof test). Therefore, in some embodiments, the side of the micro-perforated plate 651 facing the diaphragm may be provided with the 025HY-type mesh such that the micro-perforated plate sound absorption structure may be waterproof and dustproof. In some embodiments, an acoustic resistance of the 025HY-type gauze mesh may be smaller than 50 MKS Rayls. As a result, the side of the micro-perforated plate 651 facing the diaphragm may be provided with the gauze mesh, and the acoustic resistance of the gauze mesh may be smaller than 50 MKS Rayls, so that the micro-perforated plate 651 may be waterproof and dustproof and the output effect of the acoustic device (e.g., the second acoustic hole) may be hardly affected.

The cavity 652 may be a cavity away from the second acoustic cavity 440, which may communicate with the outside world merely through the through holes on the micro-perforated plate 651. In some embodiments, a shape of the cavity 652 may include, but is not limited to, the cuboid shown in FIG. 6, and a regular body shape such as a sphere or a cylinder or an irregular body shape such as a runway shape. In some embodiments, the cavity 652 may have a certain height D (see FIG. 6), and the larger the cavity height D is, the wider the sound absorption bandwidth of the cavity height D may be. Therefore, in some embodiments, the sound absorption effect of the micro-perforated plate sound absorption structure may be enhanced by configuring a relatively large cavity height D.

Figure 10:
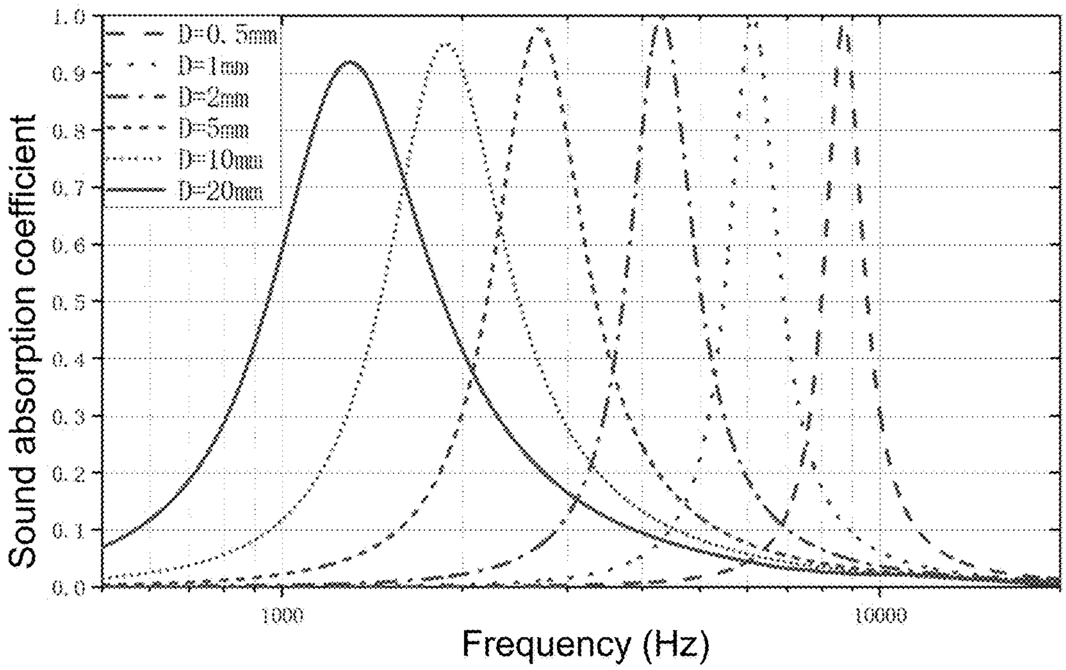
FIG. 10 is a graph illustrating sound absorption coefficient curves of a micro-perforated plate sound absorption structure with different cavity heights according to some embodiments of the present disclosure.

FIG. 10 is a graph illustrating sound absorption coefficient curves of a micro-perforated plate sound absorption structure with different cavity heights according to some embodiments of the present disclosure. As shown in FIG. 10, as the height D of the cavity 652 increases, the peak value abscissa of the corresponding curve gradually shifts to the left, a peak value of the corresponding curve gradually decreases, but a coverage width of the corresponding curve gradually increases. Therefore, the larger the cavity height D is, the lower the absorption frequency may be, and the smaller the maximum sound absorption coefficient may be, but the wider the sound absorption bandwidth may be.

Figure 11:
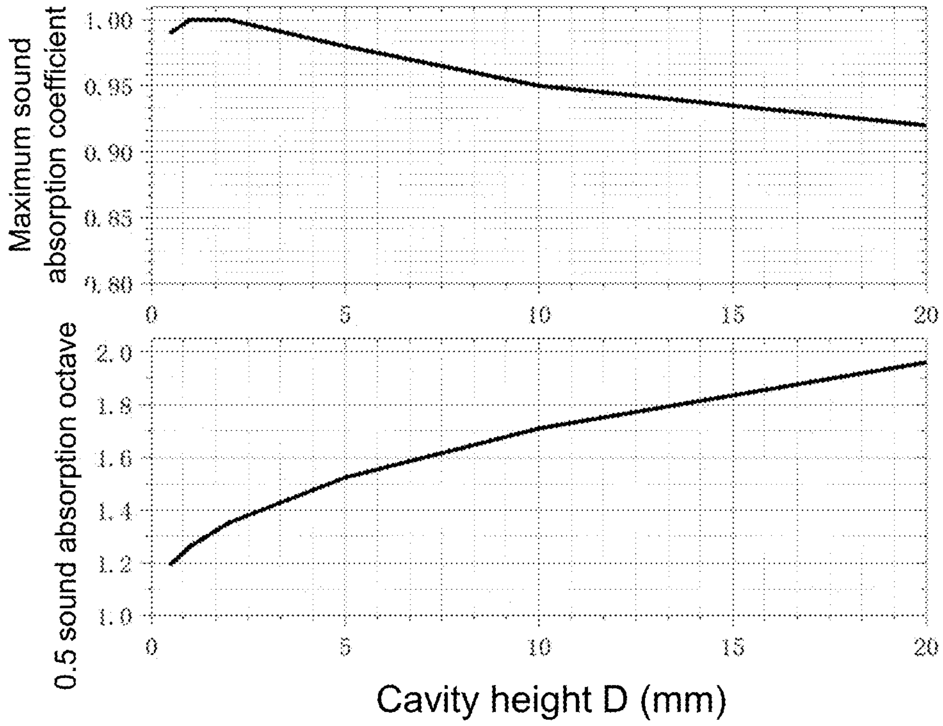
FIG. 11 is a comparison diagram illustrating change trends of a maximum sound absorption coefficient and a 0.5 sound absorption octave of an acoustic device with different cavity heights according to some embodiments of the present disclosure.

FIG. 11 is a comparison diagram illustrating change trends of a maximum sound absorption coefficient and a 0.5 sound absorption octave of an acoustic device with different cavity heights according to some embodiments of the present disclosure. The 0.5 sound absorption octave refers to an octave range that the sound absorption curve spans when the sound absorption coefficient is 0.5. The larger the octave is, the wider the sound absorption bandwidth may be. As shown in FIG. 11, as the cavity height D increases, the corresponding maximum sound absorption coefficient may gradually decrease, but the 0.5 acoustic octave may gradually increase, which may mean that the sound absorption bandwidth may become gradually wider.

In summary, the greater the height D of the cavity 652 is, the wider the sound absorption bandwidth may be obtained near a required resonant sound absorption frequency. However, the larger the height of the cavity is, the smaller the maximum sound absorption coefficient corresponding to the resonant sound absorption frequency may be. Therefore, in some embodiments, to balance the sound absorption bandwidth and the maximum sound absorption coefficient of the micro-perforated plate sound absorption structure, a value of the cavity height D may be in a range of 0.5 mm-10 mm. For example, the value of the cavity height D may be in a range of 2 mm-9 mm. As another example, the value of the cavity height D may be in a range of 4 mm-9 mm. As yet another example, the value of the cavity height D may be in a range of 7 mm-10 mm.

In some embodiments, a plurality of through holes may be disposed on the micro-perforated plate 651, and the plurality of through holes may be spaced apart. In some embodiments, the plurality of through holes may be distributed in any manner. For example, the plurality of through holes may be distributed in an array. For example, the plurality of through holes may be distributed in a ring around a central point. In some embodiments, spacings between the through holes (also referred to as hole spacings) may be the same or uneven. The spacing between two through holes described in the present disclosure refers to the minimum distance between an edge of a through hole and an edge of an adjacent through hole.

In some embodiments, the hole spacing between two through holes may be much greater than a hole diameter of at least one through hole (the hole diameter refers to a diameter of the at least one through hole), and a ratio of the hole spacing to the hole diameter of the at least one through hole may be greater than 3. In some embodiments, the hole spacing may be much greater than the hole diameter of the at least one through hole, and the ratio of the hole spacing to the hole diameter of the at least one through hole may be greater than 5. In some embodiments, the hole spacing may be much greater than the hole diameter of the at least one through hole, and the ratio of the hole spacing to the hole diameter of the at least one through hole may be greater than 7. In some embodiments, the hole spacing may be much greater than the hole diameter of the at least one through hole, and the ratio of the hole spacing to the hole diameter of the at least one through hole may be greater than 10. When the hole spacing is greater than the hole diameter, characteristics of the sound waves transmitted by the through holes may not affect each other.

In some embodiments, the hole spacing of the two through holes on the micro-perforated plate may be much smaller than a wavelength of a sound in the target frequency range. In some embodiments, a ratio of the wavelength of the sound in the target frequency range to the hole spacing may be greater than 5. In some embodiments, the ratio of the wavelength of the sound in the target frequency range to the hole spacing may be greater than 7. In some embodiments, the ratio of the wavelength of the sound in the target frequency range to the hole spacing may be greater than 10. Merely by way of example, the target frequency range may be 3 kHz-6 kHz, and the wavelength of the sound in the target frequency range may be in a range of 56 mm-110 mm. The ratio of the wavelength of the sound in the target frequency range to the hole spacing may be greater than 5, for example, the hole spacing may be in a range of 10 mm-22 mm. When the hole spacing is much smaller than the wavelength, a reflection of an inter-hole plate (i.e., a region of the micro-perforated plate 651 between the edge of the through hole and the edge of the adjacent through hole) on the sound wave may be neglected, so that the effect of the reflection of the inter-hole plate on the sound wave transmission process may be avoided.

In some embodiments, in an effective hole diameter range, the smaller the hole diameter of the at least one through hole is, the larger the acoustic resistance for the sound wave passing through the at least one through hole may be, the more the energy may be dissipated, and the wider the sound absorption bandwidth may be. Therefore, the sound absorption effect of the micro-perforated plate sound absorption structure may be enhanced by setting a relatively small hole diameter for the at least one through hole. The effective hole diameter range refers to that the sound absorption bandwidth of the micro-perforated plate sound absorption structure with the hole diameter in the effective hole diameter range may meet the requirements of sound leakage reduction. When the hole diameter is in the effective hole diameter range, the smaller the hole diameter is, the better the sound absorption effect may be. When the hole diameter is smaller than the effective hole diameter range, the sound absorption bandwidth may be greatly decreased. In some embodiments, the effective hole diameter range may be in a range of 0.1 mm-1 mm. At the same time, considering machining process requirements, in some embodiments, the effective hole diameter range may be in a range of 0.2 mm-0.4 mm. For example, the effective hole diameter range may be in a range of 0.2 mm-0.3 mm. In some embodiments, the effective hole diameter range may be in a range of 0.1 mm-0.4 mm. For example, the effective hole diameter range may be in a range of 0.1 mm-0.2 mm.

Figure 12:
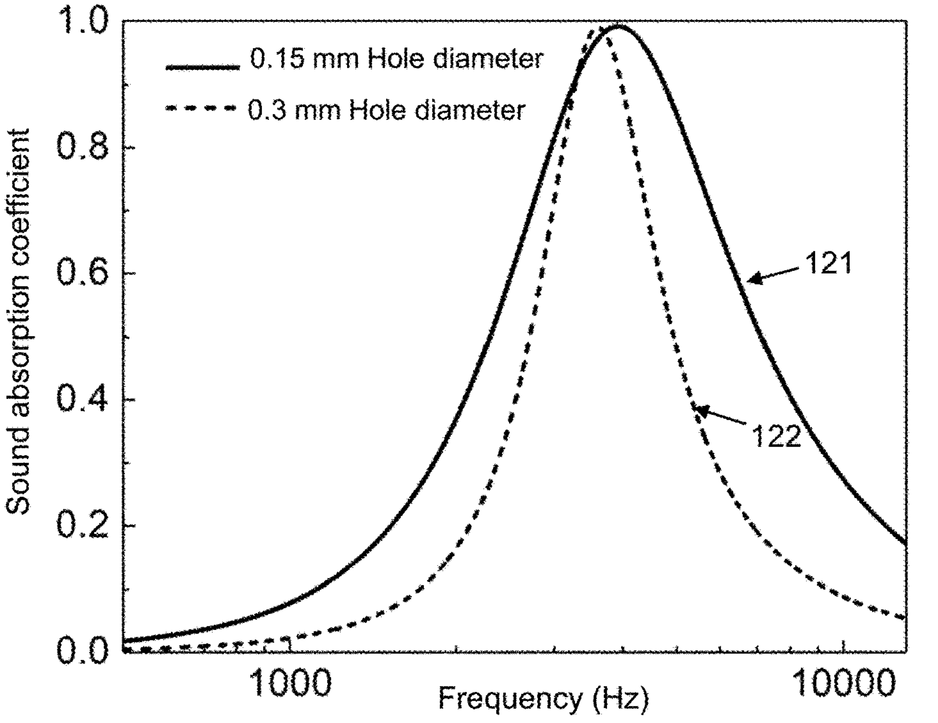
FIG. 12 is a graph illustrating sound absorption effects of a micro-perforated plate with through holes of hole diameters of 0.15 mm and 0.3 mm, respectively, according to some embodiments of the present disclosure.

FIG. 12 is a graph illustrating sound absorption effects of the micro-perforated plate 651 with through holes of hole diameters of 0.15 mm and 0.3 mm, respectively according to some embodiments of the present disclosure. The horizontal axis in FIG. 12 indicates a sound absorption frequency, the vertical axis indicates a sound absorption coefficient, the curve 121 indicates the sound absorption effect corresponding to the micro-perforated plate 651 with the through hole of the hole diameter of 0.15 mm, and the curve 122 indicates the sound absorption effect corresponding to the micro-perforated plate 651 with the through hole of the hole diameter of 0.3 mm. As shown in FIG. 12, a width of the curve 121 is greater than that of the curve 122, but heights of the curve 121 and the curve 122 are similar. It may be seen that a sound absorption bandwidth and the sound absorption effect of the micro-perforated plate 651 with the through hole of the hole diameter of 0.15 mm is significantly better than a sound absorption bandwidth and the sound absorption effect of the micro-perforated plate 651 with the through hole of the hole diameter of 0.3 mm.

Figure 13:
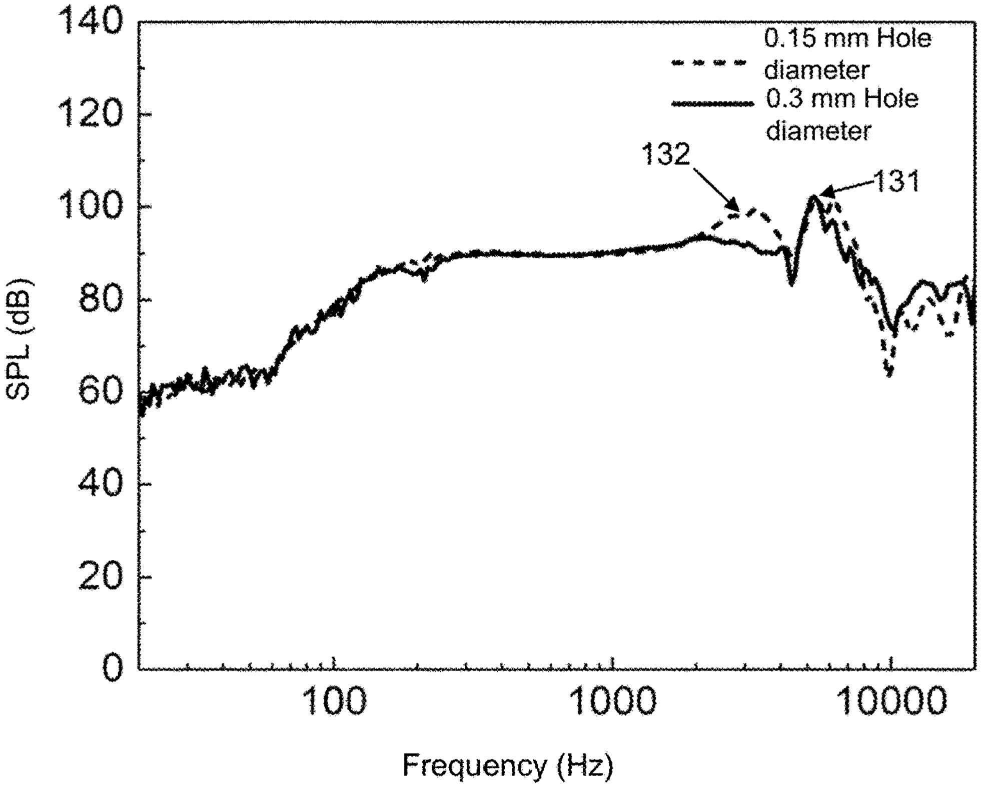
FIG. 13 is a graph illustrating frequency response curves of a micro-perforated plate of hole diameters of 0.15 mm and 0.3 mm according to some embodiments of the present disclosure.

FIG. 13 is a graph illustrating frequency response curves of the micro-perforated plate 651 of hole diameters of 0.15 mm and 0.3 mm according to some embodiments of the present disclosure. In FIG. 13, the horizontal axis indicates a frequency, the vertical axis indicates a sound pressure level, the curve 131 indicates a frequency response corresponding to the micro-perforated plate 651 of the hole diameter of 0.15 mm, and the curve 132 indicates a frequency response corresponding to the micro-perforated plate 651 of the hole diameter of 0.3 mm. The frequency response refers to a frequency response of the sound emitted from the second acoustic hole. As shown in FIG. 13, the sound leakage of the curve 131 in the 2 kHz-4 kHz band is about 6 dB lower than the curve 132. It may be seen that a sound absorption effect of the micro-perforated plate 651 of the hole diameter of 0.15 mm is significantly better than that of the micro-perforated plate 651 of the hole diameter of 0.3 mm in a mid-high-frequency range. Therefore, in some embodiments, the micro-perforated plate 651 of the hole diameter of 0.15 mm or close to 0.15 mm may be used for a better sound absorption effect. For example, the micro-perforated plate 651 of a hole diameter in a range of 0.1 mm-0.2 mm may be used. In some embodiments, considering the need for dustproof and drainage, the micro-perforated plate 651 of the hole diameter of 0.3 mm or close to 0.3 mm (e.g., 0.28 mm-0.35 mm) may be used.

In some embodiments, a perforation rate of the micro-perforated plate 651 may be smaller than 5% to avoid a too small hole spacing caused by an excessive count of through holes from affecting sound waves transmission characteristics of the through holes. The perforation rate refers to a ratio between a total area of the through holes and an area of a side of the micro-perforated plate 651 close to the second acoustic cavity 440.

It may be seen from the above that the cavity height D, the plate thickness, the hole diameter of the through hole, and the perforation rate of the micro-perforated plate 651 all influence the sound absorption bandwidth and the sound absorption coefficient of the micro-perforated plate 651, and the comprehensive values of the parameters may be found below.

In general, the acoustic impedance of a single through hole on the micro-perforated plate 651 may be:

$$Z = \frac{32\rho\mu t}{d^2}\sqrt{1+\frac{x^2}{32}} + j\omega\rho t\left(1+\frac{1}{\sqrt{9+\frac{x^2}{2}}}\right) \tag{1}$$

where ρ denotes an air density, μ denotes an air motion viscosity coefficient, t denotes the plate thickness, and d denotes the hole diameter. When the plate thickness of the through hole is comparable to the hole diameter, it may be necessary to consider an end correction of the through hole, that is, the effective plate thickness may be increased by 0.85d. The micro-perforated plate 651 is provided with a plurality of through holes, and the acoustic impedance of the micro-perforated plate 651 may be equated to the parallel connection of the acoustic impedances of the plurality of through holes, i.e., an acoustic impedance rate of the micro-perforated plate 651 may be obtained from an acoustic impedance rate of the single through hole divided by a perforation rate of the micro-perforated plate 651.

$$Z_{MPP} = \frac{32\rho\mu t}{\sigma d^2}\left(\sqrt{1+\frac{x^2}{32}} + \frac{k\sqrt{2}}{8}\frac{d}{t}\right) + j\omega\rho t\left(1+\frac{1}{\sqrt{9+\frac{x^2}{2}}} + 0.85\frac{d}{t}\right) \tag{2}$$

where σ denotes the perforation rate, k denotes a wavenumber. The expression of the wavenumber is $$k = \frac{\omega}{c},$$

where ω denotes an angular frequency, and c denotes a speed of sound. The cavity 652 of the micro-perforated plate sound absorption structure may be equivalent to a sound capacitance, and the acoustic impedance rate may be:

$$Z_D = -j\rho c \cdot \cot\left(\frac{\omega D}{c}\right) \tag{3}$$

where D denotes the cavity height, and the acoustic impedance of the micro-perforated plate sound absorption structure of may be expressed as follows.

$$Z_{total} = Z_{MPP} + Z_D \tag{4}$$

After normalization, $$\frac{Z_{total}}{\rho c} = r + j\omega m - j\rho c \cdot \cot\left(\frac{\omega D}{c}\right) \tag{5}$$

where r denotes a relative acoustic resistivity, and m denotes a relative acoustic mass, specifically, $$r = \frac{32\mu t}{\sigma c d^2}\left(\sqrt{1 + \frac{k^2}{32}} + \frac{k\sqrt{2}}{8}\frac{d}{t}\right) \tag{6}$$

$$m = \frac{c}{\sigma c}\left(1 + \frac{1}{\sqrt{9 + \frac{k^2}{2}}} + 0.85\frac{d}{t}\right) \tag{7}$$

When the sound wave is incident vertically, the sound absorption coefficient α of the micro-perforated plate sound absorption structure may be solved as:

$$\alpha = 1 - \left(\frac{Z_{total} - 1}{Z_{total} + 1}\right)^2 \tag{8}$$

The resonant frequency of the sound absorption structure 650 may be:

$$2\pi f_0 m - \cot\left(2\pi f_0 \frac{D}{c}\right) = 0 \tag{9}$$

According to Equation (1) to Equation (9), the sound absorption bandwidth and the sound absorption coefficient of the sound absorption structure 650 may be controlled by adjusting the hole diameter, the perforation rate, and the plate thickness of the micro-perforated plate 651, and the cavity height.

In addition, a combination of parameters may be comprehensively determined by combining a value of the parameter such as the hole diameter, the perforation rate, the plate thickness, and the cavity height with considerations of the sound absorption coefficient, the sound absorption frequency range, and the structure size. For example, the sound absorption bandwidth and the maximum sound absorption coefficient of the sound absorption structure 650 may be constrained by each other, and may be balanced according to the actual needs. For example, the smaller the hole diameter of the micro-perforated plate 651 is, the wider the sound absorption bandwidth may be. The wider sound absorption bandwidth may correspond to an effective hole diameter range. When the hole diameter is in the effective hole diameter range, the smaller the hole diameter is, the better the sound absorption effect may be. When the hole diameter is smaller than the effective hole diameter range, the sound absorption bandwidth may greatly decrease. For example, a small hole diameter, a large perforation rate, a small plate thickness, and a small cavity height may be suitable for a high-frequency sound absorption range. A large hole diameter, a small perforation rate, a large plate thickness, and a large cavity height may be suitable for a low-frequency sound absorption range.

In some embodiments, the hole diameter may be in a range of 0.1 mm-0.2 mm, the perforation rate may be in a range of 2%-5%, the plate thickness may be in a range of 0.2 mm-0.7 mm, and the cavity height may be in a range of 7 mm-10 mm. Merely by way of example, the hole diameter of the micro-perforated plate 651 may be in a range of 0.1 mm-0.2 mm, the perforation rate may be in a range of 2.18%-4.91%, the plate thickness may be in a range of 0.3 mm-0.6 mm, and the cavity height may be in a range of 7.5 mm-9.5 mm. For example, the micro-perforated plate 651 may have a hole diameter of 0.15 mm, a perforation rate of 2.18%, a plate thickness of 0.3 mm, and a cavity height of 9 mm. As another example, the micro-perforated plate 651 may have a hole diameter of 0.15 mm, a perforation rate of 2.76%, a plate thickness of 0.4 mm, and the cavity height of 7.5 mm. As yet another example, the micro-perforated plate 651 may have a hole diameter of 0.15 mm, a perforation rate of 3.61%, the plate thickness of 0.5 mm, and the cavity height of 9 mm.

Figure 14:
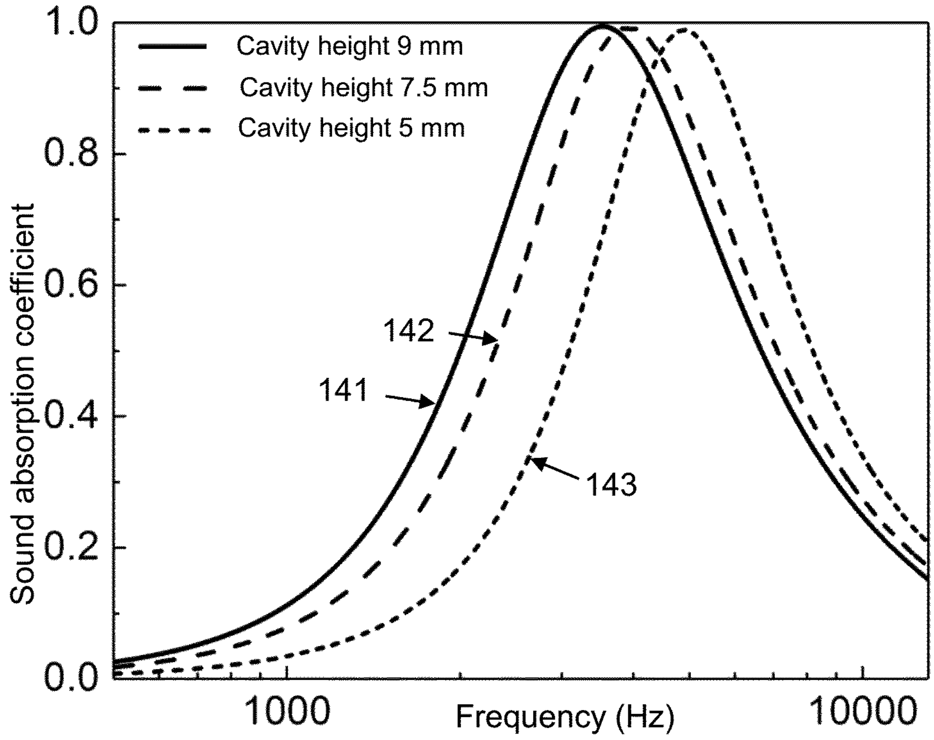
FIG. 14 is a graph illustrating sound absorption effects corresponding to micro-perforated plates of different cavity heights and with a hole diameter of 0.15 mm, a perforation rate of 2.18%, and a plate thickness of 0.3 mm according to some embodiments of the present disclosure.

FIG. 14 is a graph illustrating sound absorption effects corresponding to micro-perforated plates 651 with different cavity heights and with a hole diameter of 0.15 mm, a perforation rate of 2.18%, and a plate thickness of 0.3 mm according to some embodiments of the present disclosure. In FIG. 14, the horizontal axis indicates a frequency, the vertical axis indicates a sound absorption coefficient, the curve 141 indicates the sound absorption effect corresponding to the micro-perforated plate 651 with the cavity height of 9 mm, the curve 142 indicates the sound absorption effect corresponding to the micro-perforated plate 651 with the cavity height of 7.5 mm, and the curve 143 indicates the sound absorption effect corresponding to the micro-perforated plate 651 with the cavity height of 5 mm. As shown in FIG. 14, there is little difference between the sound absorption effects corresponding to the cavity heights of 7.5 mm and 9 mm. If the cavity height is reduced to 5 mm, a sound absorption center frequency (a frequency corresponding to a largest sound absorption coefficient) corresponding to the micro-perforated plate 651 shifts from 4 kHz to 4.9 kHz, and the sound absorption coefficient is significantly reduced in a frequency band (e.g., 2 kHz-4.9 kHz) lower than the sound absorption center frequency. As a result, the sound absorption effects corresponding to the cavity heights of 9 mm, 7.5 mm, and 5 mm meet the demand for sound leakage reduction, but the sound absorption effect corresponding to the cavity height of 5 mm is poorer than the sound absorption effects corresponding to the cavity heights of 9 mm and 7.5 mm.

In some embodiments, the hole diameter may be in a range of 0.2 mm-0.4 mm, the perforation rate may be in a range of 1%-5%, the plate thickness of the micro-perforated plate 651 may be in a range of 0.2 mm-0.7 mm, and the cavity height may be in a range of 4 mm-9 mm. Merely by way of example, the hole diameter of the micro-perforated plate 651 may be in a range of 0.25 mm-0.3 mm, the perforation rate may be in a range of 1.11%-4.06%, the plate thickness of the micro-perforated plate 651 may be in a range of 0.3 mm-0.6 mm range, and the cavity height may be in a range of 4 mm-8.5 mm. For example, the micro-perforated plate 651 may have a hole diameter of 0.3 mm, a perforation rate of 2.18%, a plate thickness of 0.5 mm, and a cavity height of 5 mm. As another example, the micro-perforated plate 651 may have a hole diameter of 0.25 mm, a perforation rate of 3.41%, a plate thickness of 0.6 mm, and a cavity height of 8.5 mm. As yet another example, the micro-perforated plate 651 may have a hole diameter of 0.3 mm, a perforation rate of 2.45%, a plate thickness of 0.5 mm, and a cavity height of 6 mm.

Figure 15:
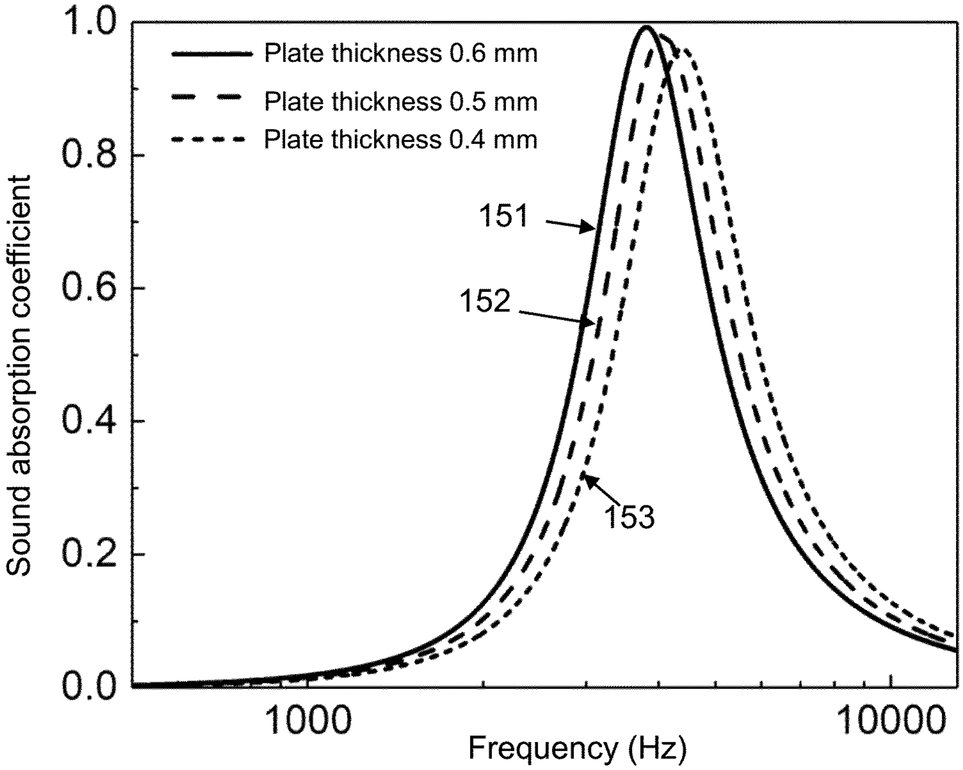
FIG. 15 is a graph illustrating sound absorption effects corresponding to micro-perforated plates with different plate thicknesses and with a hole diameter of 0.3 mm, a perforation rate of 2.18%, and a cavity height of 5 mm according to some embodiments of the present disclosure.

FIG. 15 is a graph illustrating sound absorption effects corresponding to micro-perforated plates 651 with different plate thicknesses and with a hole diameter of 0.3 mm, a perforation rate of 2.18%, and a cavity height of 5 mm according to some embodiments of the present disclosure. In FIG. 15, the horizontal axis indicates a frequency, the vertical axis indicates a sound absorption coefficient, the curve 151 indicates the sound absorption effect corresponding to the micro-perforated plate 651 with the plate thickness of 0.6 mm, the curve 152 indicates the sound absorption effect corresponding to the micro-perforated plate 651 with the plate thickness of 0.5 mm, and the curve 153 indicates the sound absorption effect corresponding to the micro-perforated plate 651 with the plate thickness of 0.4 mm. As shown in FIG. 15, sound absorption center frequencies of the curve 151, the curve 152, and the curve 153 gradually increase, and maximum sound absorption coefficients of the curve 151, the curve 152, and the curve 153 gradually decrease. The sound absorption effects corresponding to the plate thickness of 0.4 mm, the plate thickness of 0.5 mm, and the plate thickness of 0.6 mm meet the demand for sound leakage reduction, but the sound absorption effects corresponding to the plate thickness of 0.4 mm and the plate thickness of 0.6 mm are poorer than the sound absorption effect corresponding to the plate thickness of 0.4 mm. In some embodiments, a mass of the acoustic device may be reduced when the micro-perforated plate 651 with the plate thickness of 0.4 mm is used. Therefore, considering the wearing experience of the user, the micro-perforated plate of the plate thickness of 0.4 mm may also be used.

The sound absorption bandwidth and sound absorption coefficient may be balanced by setting the combination of the above parameters, so that the sound absorption structure may effectively absorb the sound wave in the target frequency range and the sound leakage reduction effect in the target frequency range may be enhanced. Additionally, different combinations of parameters may be applied to the needs of different application scenarios.

Figure 16:
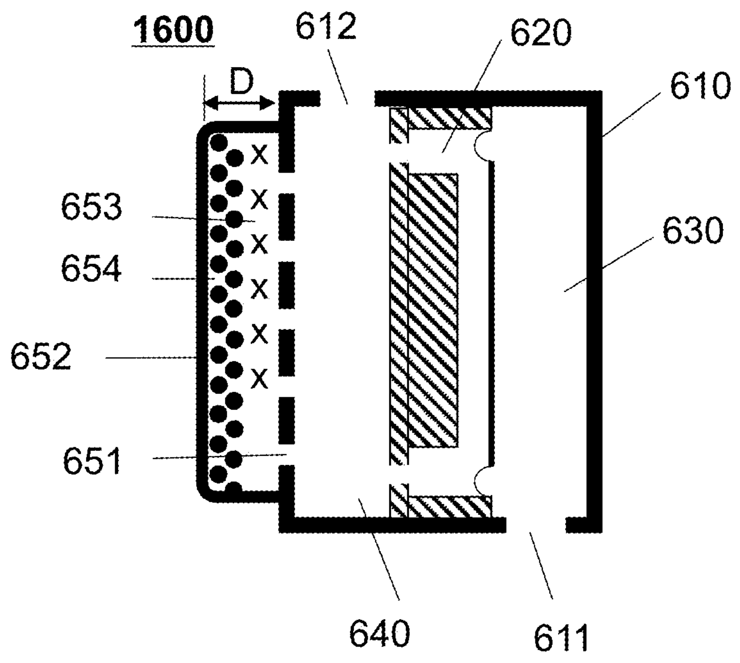
FIG. 16 is a schematic diagram illustrating an exemplary structure of an acoustic device with a sound absorption structure according to some embodiments of the present disclosure.

In some embodiments, a too small size of a through hole may increase a difficulty of the manufacturing process and a relatively large cavity depth D may increase a size of the acoustic device. In such cases, the sound absorption effect of the micro-perforated plate sound absorption structure may be enhanced using a resistive sound absorption structure. FIG. 16 is a schematic diagram illustrating an exemplary structure of an acoustic device with a sound absorption structure according to some embodiments of the present disclosure. As shown in FIG. 16, a resistive sound absorption structure may be disposed in the cavity 652 of a micro-perforated plate sound absorption structure. In some embodiments, the resistive sound absorption structure may include a filling material 654 (e.g., N'Bass particles or a porous sound absorption material). The filling material 654 may be used to increase an equivalent height of the cavity 652 of the micro-perforated plate sound absorption structure, thereby reducing a design size of the acoustic device 1600 while enhancing the sound absorption effect of the micro-perforated plate sound absorption structure. Specifically, the filling material 654 has a "sponge" effect, air molecules may be adsorbed and desorbed between the holes of the filling material 654 when sound waves are transmitted, which may be regarded as a decrease in a speed of sound in the filling material 654, and may be equivalent to increasing a volume of the cavity 652, thereby achieving the purpose of broadening the sound absorption bandwidth of the micro-perforated plate 651 and increasing the sound absorption coefficient (without affecting the sound absorption center frequency), which may in turn enhance the sound absorption effect of the micro-perforated plate sound absorption structure and reduce the design size of the acoustic device.

In some embodiments, the cavity 652 may be at least partially filled with N'Bass (silica-aluminate) sound absorption particles. In some embodiments, the N'Bass sound absorption particles may be at least partially filled in the cavity 652 in various manners. Merely by way of example, the N'Bass sound absorption particles may be directly filled in the cavity 652. The N'Bass sound absorption particles may be filled in a powder packet, and the powder packet may be disposed in the cavity 652. The N'Bass sound absorption particles may be encapsulated in a gauze mesh in a specific shape, and the gauze mesh may be disposed in the cavity 652. The N'Bass sound absorption particles may be at least partially filled in the cavity 652 in at least two of the above filling manners.

In some embodiments, the smaller the N'Bass sound absorption particles, the smaller the spacing between the sound absorption particles, i.e., the greater the adsorption effect on the air molecules. Accordingly, the smaller the particles, the more the N'Bass sound absorption particles may need to be filled in, and the higher the cost may be. Therefore, a diameter of at least one of the N'Bass sound absorption particles may be in a range of 0.15 mm-0.7 mm to ensure the sound absorption effect and take the cost into account. For example, the diameter of at least one of the N'Bass sound absorption particles may be in a range of 0.15 mm-0.6 mm. As another example, the diameter of at least one of the N'Bass sound absorption particles may be in a range of 0.2 mm-0.6 mm. As yet another example, the diameter of at least one of the N'Bass sound absorption particles may be in a range of 0.3 mm-0.5 mm.

In some embodiments, as a filling ratio of the N'Bass sound absorption particles in the cavity 652 gradually increases, the more the N'Bass sound absorption particles in the cavity 652 may be, and the stronger the sound absorption effect may gradually be. The filling ratio refers to a ratio of a volume of filled N'Bass sound absorption particles to a volume of the cavity 652. However, when the N'Bass sound absorption particles are completely filled in the cavity 652, pressure of a plate surface of the micro-perforated plate sound absorption structure on the N'Bass sound absorption particles may cause the N'Bass sound absorption particles to break, thereby blocking gaps between the N'Bass sound absorption particles, which may in turn reduce the sound absorption effect.

Figure 17:
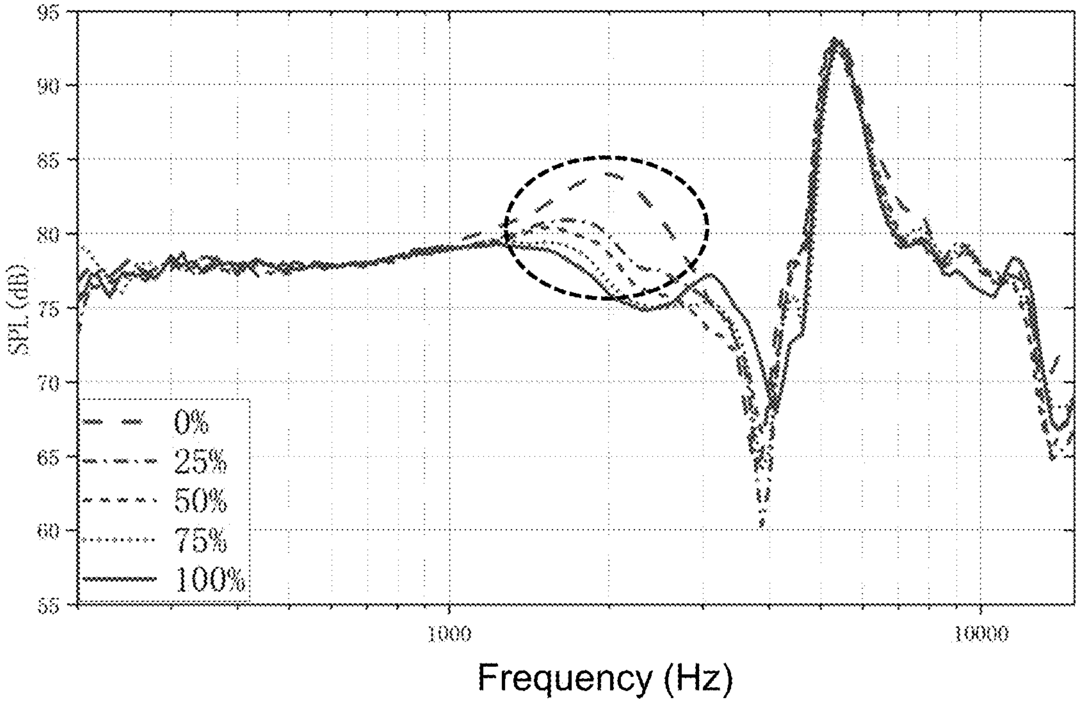
FIG. 17 is a graph illustrating frequency response curves of second acoustic cavities of acoustic devices corresponding to different filling ratios of filling materials according to some embodiments of the present disclosure.

FIG. 17 is a graph illustrating frequency response curves of second acoustic cavities of acoustic devices corresponding to different filling ratios of filling materials according to some embodiments of the present disclosure. As shown in FIG. 17, when the filling ratio of the filling material (e.g., N'Bass sound absorption particles) is 0%, i.e., no filling material is filled in a cavity of a micro-perforated plate sound absorption structure, the frequency response curve corresponding to the second acoustic cavity of the acoustic device forms a wave peak near 2 kHz (as shown by the dotted circle in FIG. 17), which indicates that the second acoustic cavity has a relatively large sound volume at 2 kHz. When the filling ratio of the filling material is 25%, i.e., when 25% of a space in the cavity of the micro-perforated plate sound absorption structure is filled with the filling material, the wave peak near 2 kHz is largely absorbed, but there is still a small wave peak. When the filling ratio of the filling material is 50%, i.e., when 50% of the space of the cavity of the micro-perforated plate sound absorption structure is filled with the filling material, the wave peak near 2 kHz is further absorbed, and the corresponding frequency response curve becomes flat. When the filling ratio of the filling material is 75%, i.e., when 75% of the space of the cavity of the micro-perforated plate sound absorption structure is filled with the filling material, the wave peak near 2 kHz is further absorbed, but a wave peak is formed near 3 kHz, and the sound volume of the second acoustic cavity near 3 kHz increases slightly. When the filling ratio of the filling material is 100%, i.e., when the cavity of the micro-perforated plate sound absorption structure is completely filled with the filling material, the wave peak near 2 kHz is further absorbed, but a wave peak near 3 kHz further increases, the peak value is obvious, and the sound volume of the second acoustic cavity near 3 kHz further increases. To make the frequency response curve of the second acoustic cavity flat and avoid the wave peak in the curve as much as possible in a preset range (e.g., in a range of 2 kHz-3 kHz), in some embodiments, the filling ratio of the filling material value may be in a range of 60%-100%. In some embodiments, the filling ratio may be in a range of 70%-95%. For example, the filling ratio may be in a range of 75%-90%. As another example, the filling ratio may be in a range of 80%-90%. In some embodiments, considering the cost of filling the N'Bass sound absorption particles, the filling ratio may be in a range of 75%-85%. For example, the filling ratio may be 80%.

The filling ratio of the N'Bass sound absorption particles may set in the range of 70%-95%, which may ensure the sound absorption effect and prevent blocking of gaps and reduction of the sound absorption effect caused by the pressure of the micro-perforated plate sound absorption structure on the N'Bass sound absorption particles.

In some embodiments, since the diameter of at least one of the N'Bass sound absorption particles is close to or smaller than the hole diameter of the through hole, to prevent the N'Bass sound absorption particles from blocking the through hole, as shown in FIG. 16, a gauze mesh 653 may be disposed between the N'Bass sound absorption particles and the micro-perforated plate 651. In some embodiments, a side of the micro-perforated plate 651 away from the second acoustic cavity 640 (or a diaphragm) may be covered with the gauze mesh 653. The gauze mesh 653 may cover all through holes on the micro-perforated plate 651. In some embodiments, the gauze mesh 653 may be disposed in the cavity 652 between the N'Bass sound absorption particles and the micro-perforated plate 651. Specifically, the gauze mesh 653 may be connected to an inner wall of the cavity 652 between the N'Bass sound absorption particles and the micro-perforated plate 651.

In some embodiments, a porous sound absorption material may be included in the cavity 652. In some embodiments, the porous sound absorption material may include, but is not limited to, polyurethane, polypropylene, melamine sponge, wood wool board, wool felt, etc. In some embodiments, the porous sound absorption material may be filled in a manner similar to the manner in which the N'Bass sound absorption particles are filled. In some embodiments, the porous sound absorption material may be uniformly filled in the cavity 652 for a better sound absorption effect. In some embodiments, a porosity of the porous sound absorption material may be greater than 70% for the better sound absorption effect. The porosity refers to a percentage of a volume of pores in the porous sound absorption material to a total volume of the porous sound absorption material.

In some embodiments, the micro-perforated plate sound absorption structure may effectively reduce a sound pressure level of 4 dB-20 dB in a frequency band of 4 kHz-6 kHz. When the cavity 652 of the micro-perforated plate sound absorption structure is at least partially filled with the porous sound absorption material or the N'Bass sound absorption particles, the sound absorption frequency band may be further extended to the low frequency. The sound absorption solutions of the porous sound absorption material and the N'Bass sound absorption particles may have better sound absorption effects. More description regarding the sound absorption effects of the porous sound absorption material and the N'Bass sound absorption particles may be found in FIG. 18.

Figure 18:
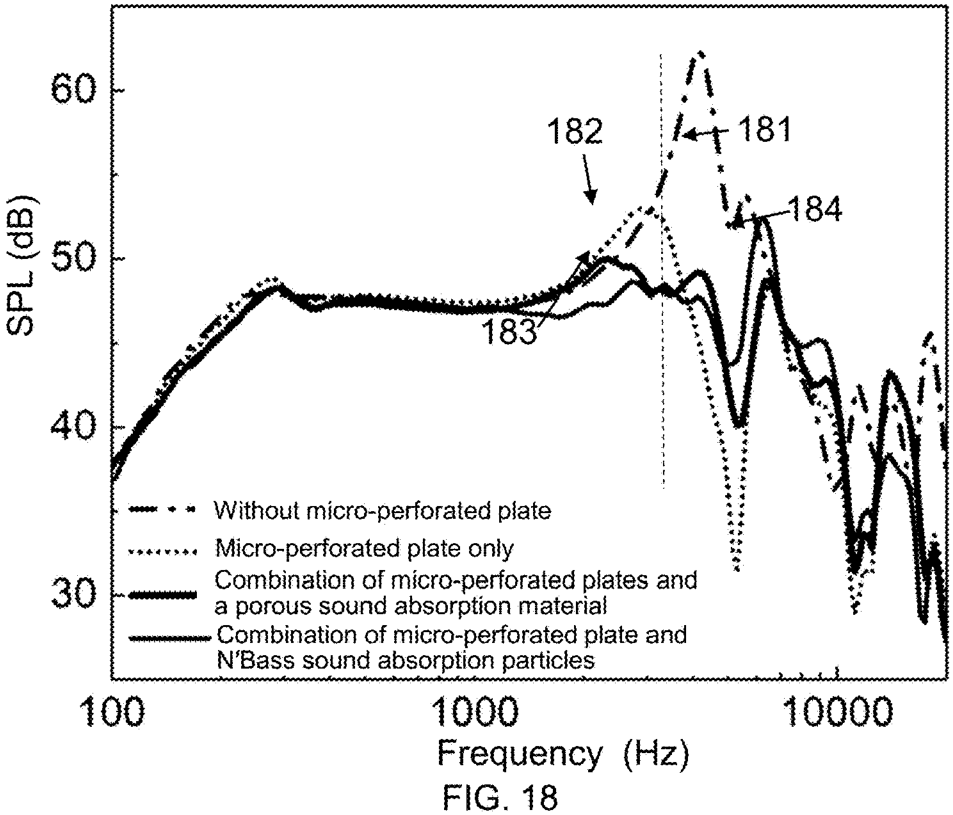
FIG. 18 is a graph illustrating frequency response curves of an acoustic device without a micro-perforated plate, an acoustic device with the micro-perforated plate only, an acoustic device with a combination of the micro-perforated plate and N'Bass sound absorption particles, and an acoustic device with a combination of the micro-perforated plate and a porous sound absorption material according to some embodiments of the present disclosure.

FIG. 18 is a graph illustrating frequency response curves of an acoustic device without the micro-perforated plate 651, an acoustic device with the micro-perforated plates 651 only, an acoustic device with a combination of the micro-perforated plate 651 and N'Bass sound absorption particles, and an acoustic device with a combination of the micro-perforated plates 651 and a porous sound absorption material according to some embodiments of the present disclosure. In FIG. 18, the horizontal axis indicates a frequency, the vertical axis indicates the sound pressure level, the curve 181 indicates a frequency response of the acoustic device without the micro-perforated plate 651, the curve 182 indicates a frequency response of the acoustic device with the micro-perforated plate 651, the curve 183 indicates a frequency response of the acoustic device with the micro-perforated plate 651 and the porous sound absorption material filling the cavity 452, and the curve 184 indicates a frequency response of the acoustic device with the micro-perforated plate 651 and the N'Bass sound absorption particles filling the cavity 652. The frequency response refers to a frequency response of a sound emitted from the second acoustic hole. As shown in FIG. 18, the frequency response curve (the curve 181) of the acoustic device without the micro-perforated plate 651 has an extremely high resonant peak near 3.9 kHz, and 4.2 kHz corresponds to the resonant frequency of the second acoustic cavity 440. For the frequency response curve (the curve 182) of the acoustic device with the micro-perforated plate sound absorption structure, the sound pressure level of 4 dB-20 dB in a frequency band of 3 kHz-6 kHz may be effectively reduced. It may be seen that the micro-perforated plate sound absorption structure absorbs the sound wave in the range of 3 kHz-6 kHz, and the micro-perforated plate sound absorption structure absorbs the sound waves at the resonant frequency by about 20 dB, which may reduce or avoid the resonance of sound waves near the resonant frequency under the action of the second acoustic cavity 440, thereby reducing the sound leakage at the resonant frequency. When the cavity 652 of the micro-perforated plate sound absorption structure is at least partially filled with the porous sound absorption material (the curve 183) or the N'Bass sound absorption particles (the curve 184), the sound absorption frequency band further extends to the low frequency. The two sound absorption solutions of the porous sound absorption material or the N'Bass sound absorption particles have better sound absorption effects.

It should be noted that when the frequency response curve of the acoustic device without the micro-perforated plate sound absorption structure is tested, the through holes on the micro-perforated plate 651 of the acoustic device including the micro-perforated plate sound absorption structure are blocked to simulate a frequency response of the sound emitted by the second acoustic hole of the acoustic device without the micro-perforated plate sound absorption structure. For example, a back plate on a side of the cavity 652 away from the second acoustic cavity 640 is opened to make the cavity 652 change from a closed state to an open state, which may be equivalent to removing the cavity 652 in the micro-perforated plate sound absorption structure. Furthermore, the through holes of the micro-perforated plate 651 are sealed with a material such as plasticine or glue, which may be equivalent to removing the micro-perforated plate 651 in the micro-perforated plate sound absorption structure. In the above manner, the micro-perforated plate sound absorption structure may be equivalently removed with little or no impact on the volume of the second acoustic cavity 640, thereby avoiding impacting the frequency response of the second acoustic cavity 640. Further, the frequency response of the sound emitted by the second acoustic hole is tested. For example, a test microphone is placed directly in front of the second acoustic hole at a distance of about 2 mm-5 mm. A frequency response of the first acoustic hole is tested in a manner similar to the manner where the frequency response of the second acoustic hole is tested.

Figure 19:
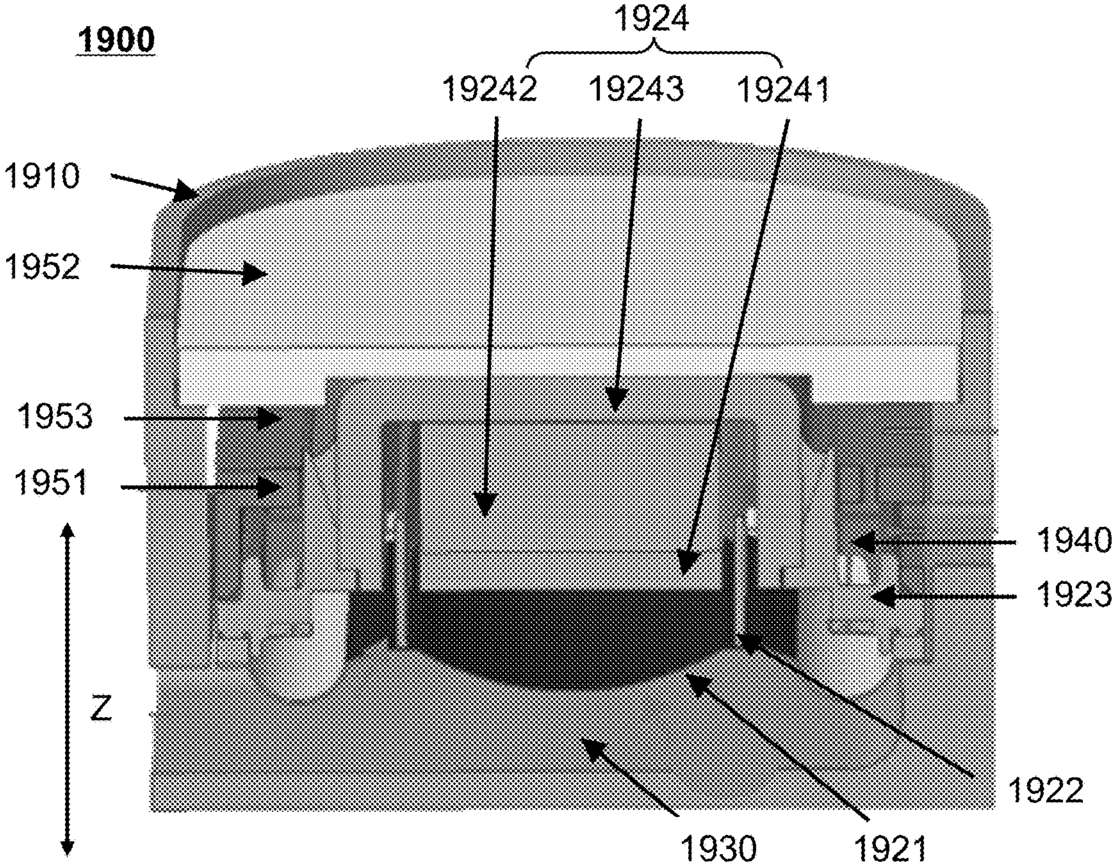
FIG. 19 is a diagram illustrating an exemplary internal structure of an acoustic device according to some embodiments of the present disclosure.
Figure 20:
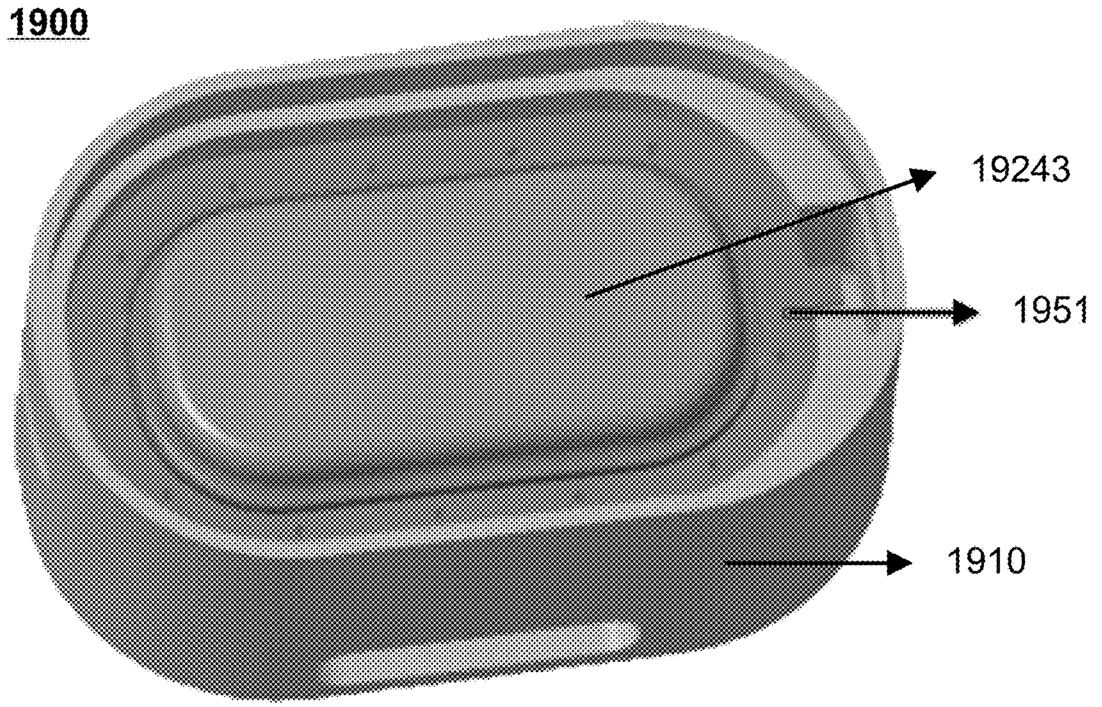
FIG. 20 is a diagram illustrating an exemplary internal structure of an acoustic device according to some embodiments of the present disclosure.

FIG. 19 is a diagram illustrating an exemplary internal structure of an acoustic device according to some embodiments of the present disclosure. FIG. 20 is a diagram illustrating an exemplary internal structure of an acoustic device according to some embodiments of the present disclosure.

As shown in FIGS. 19 and 20, a speaker may separate an accommodation cavity of a housing 1910 into a first acoustic cavity 1930 and a second acoustic cavity 1940. The speaker may include a diaphragm 1921, a coil 1922, a cone frame 1923, and a magnetic circuit assembly 1924. The cone frame 1923 may be disposed around the diaphragm 1191, the coil 1192, and the magnetic circuit assembly 1924 and may be configured to provide a mounting and fixing platform. The speaker may be connected to the housing 1910 through the cone frame 1923. The diaphragm 1921 may cover the coil 1192 and the magnetic circuit assembly 1924 in a Z-direction. At least a portion of the coil 1922 may extend into a magnetic gap formed by the magnetic circuit assembly 1924 and may be connected to the diaphragm 1921. A magnetic field generated by the coil 1922 when energized may interact with a magnetic field formed by the magnetic circuit assembly 1924, thereby driving the diaphragm 1921 to generate a mechanical vibration and produce a sound by the propagation of a medium such as the air. The sound may be output through a hole on the housing 1910. The micro-perforated plate sound absorption structure may be disposed in the second acoustic cavity 1940. For example, the micro-perforated plate sound absorption structure may be disposed around the magnetic circuit assembly 1924. The micro-perforated plate sound absorption structure may include a micro-perforated plate 1651 and a filling layer 1953. A side of the micro-perforated plate 1951 away from the diaphragm 1921 along the Z-directional may be connected to the filling layer 1953. The micro-perforated plate 1951 may be an annular structure and may be disposed around the magnetic circuit assembly 1924. The filling layer 1953 may be at least partially filled with N'Bass sound absorption particles or a porous sound absorption material. In some embodiments, the housing 1910 (e.g., a back plate 1952) and the magnetic circuit assembly 1924 may together form a closed cavity, i.e., a cavity of the micro-perforated plate sound absorption structure, and the filling layer 1953 may be filled in the cavity.

In some embodiments, the magnetic circuit assembly 1924 may include a magnetic conductive plate 19241, a magnet 19242, and a magnetic conductive cover 19243. The magnetic conductive plate 19241 and the magnet 19242 may be connected to each other. A side of the magnet 19242 away from the magnetic conductive plate 19241 may be mounted to a bottom wall of the magnetic conductive cover 19243. The magnetic gap may be formed between a circumferential side of the magnet 19242 and a circumferential inner wall of the magnetic conductive cover 19243. In some embodiments, a circumferential outer wall of the magnetic conductive cover 19243 may be connected and fixed to the cone frame 1923. In some embodiments, both the magnetic conductive cover 19243 and the magnetic conductive plate 19241 may be made of a magnetic conductive material (e.g., iron).

In some embodiments, a plurality of through holes may be disposed on the micro-perforated plate 1951, and the plurality of through holes may be disposed around the magnetic circuit assembly, which is beneficial to ensuring a proper hole spacing and perforation rate.

In some embodiments, since a side of the micro-perforated plate 1951 away from the diaphragm needs to be provided with an airtight cavity with a certain height, if the micro-perforated plate 1951 is completely disposed on a side of the magnetic circuit assembly away from the diaphragm, the micro-perforated plate 1951 and the filling layer 1953 may occupy too much space in the housing 1910, which may make it difficult to meet the small size design requirement of the acoustic device. In the acoustic device 1900 of the embodiment, the micro-perforated plate 1951 may be set as the annular structure around the magnetic circuit assembly, which may efficiently utilize a space in a circumferential direction of the magnetic circuit assembly without increasing the thickness (i.e., the size along the Z-direction) of the acoustic device and is beneficial to the miniaturization design of the acoustic device.

In some embodiments, the micro-perforated plate may be disposed on the side of the magnetic circuit assembly 1924 away from the diaphragm 1921, i.e., the micro-perforated plate 1651 and the magnetic circuit assembly may be spaced apart in the Z-direction (vibration direction of the diaphragm). The specific arrangement may be found in FIG. 4. In some embodiments, the micro-perforated plate may be a panel (e.g., runway-type, circular, etc.) adapted to fit a shape of the second acoustic cavity 1940 or the housing 1910. The parameters such as hole diameter, perforation rate, and hole spacing of the micro-perforated plate may be consistent with relevant parameters of the micro-perforated plate 1951, so that the micro-perforated plate of the panel structure may have a larger area, a relatively larger count of through holes, a better sound absorption effect, and a simple structure for easy assembly.

Figure 21:
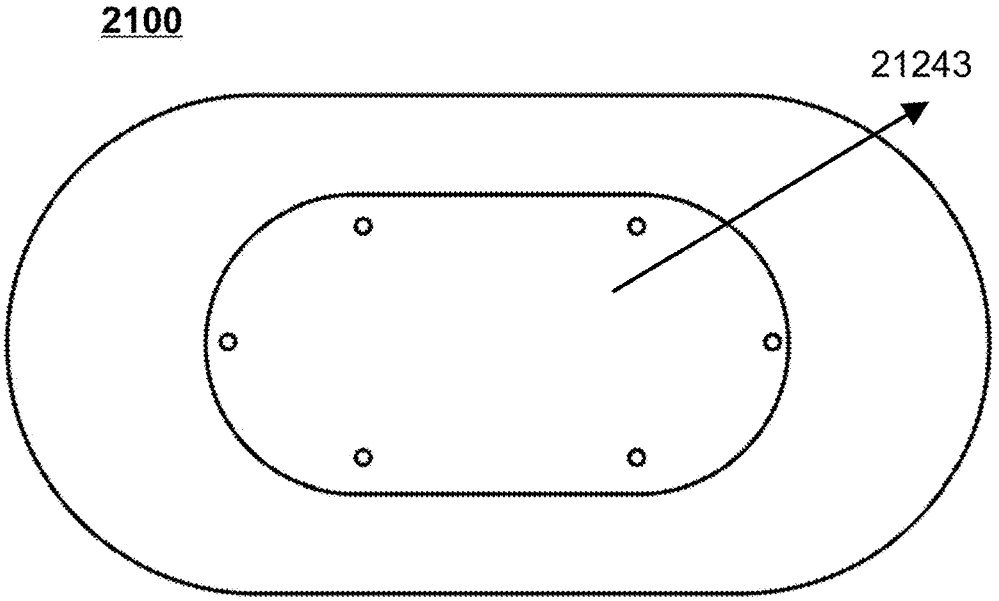
FIG. 21 is a diagram illustrating an exemplary internal structure of an acoustic device according to some embodiments of the present disclosure.

FIG. 21 is a diagram illustrating an exemplary internal structure of an acoustic device according to some embodiments of the present disclosure. The acoustic device 2100 and a speaker thereof shown in FIG. 21 may be similar to the acoustic device 1900 and a speaker thereof shown in FIG. 19 and FIG. 20, and a difference may be that there is no separately disposed micro-perforated plate.

At least a portion of the magnetic conductive element of the acoustic device 2100 may be configured as the micro-perforated plate. For example, as shown in FIG. 21, the magnetic conductive cover 21243 may be provided with a plurality of through holes at a bottom away from the diaphragm and may be configured as the micro-perforated plate. A side of the magnetic conductive cover 21243 away from the diaphragm may be connected to a cavity in a Z-direction. In some embodiments, a filling layer may be disposed in the cavity. In the embodiment, a portion of the magnetic circuit assembly may be directly set as a sound absorption structure, which may achieve the sound absorption effect, save the cost, and simplify the manufacturing process.

Figure 22:
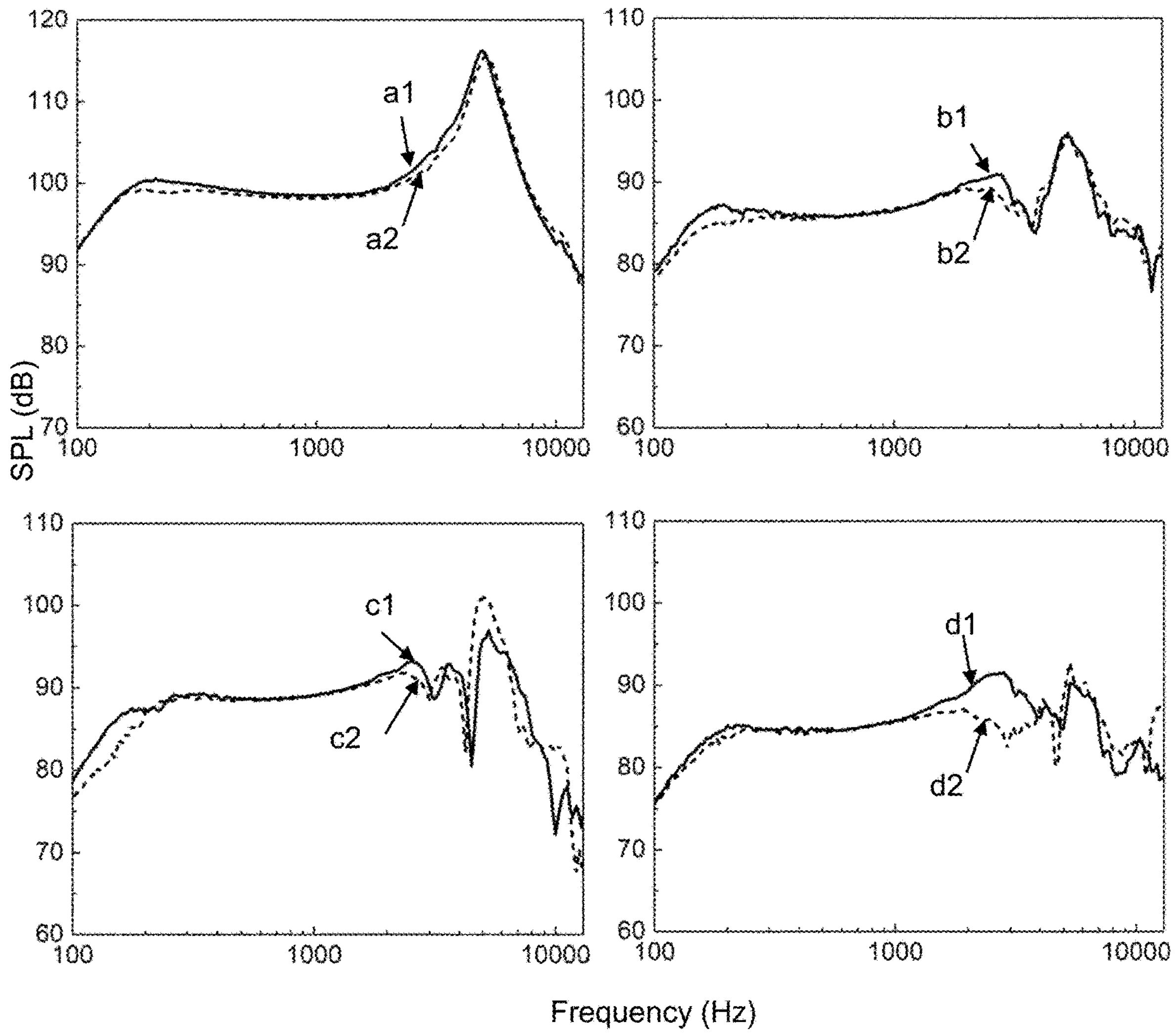
FIG. 22 is a graph illustrating frequency response curves of the acoustic device shown in FIGS. 19-20 and the acoustic device shown in FIG. 21.

FIG. 22 is a graph illustrating frequency response curves of the acoustic device 1900 shown in FIGS. 19-20 and the acoustic device 2100 shown in FIG. 21. In FIG. 22, the horizontal axis indicates a frequency, the vertical axis indicates a sound pressure level, the curve a1 indicates a frequency response of the acoustic device 2100 at a first acoustic hole, the curve a2 indicates a frequency response of the acoustic device 1900 at the first acoustic hole, the curve b1 indicates a frequency response of the acoustic device 2100 at a first pressure relief hole, the curve b2 indicates a frequency response of the acoustic device 1900 at a first pressure relief hole, the curve c1 indicates a frequency response of the acoustic device 2100 at a second pressure relief hole, the curve c2 indicates a frequency response of the acoustic device 1900 at the second pressure relief hole, the curve d1 indicates a frequency response of a sound emitted by the acoustic device 2100 at a third pressure relief hole, and the curve d2 indicates a frequency response of a sound emitted by the acoustic device 1900 at the third pressure relief hole. The first pressure relief hole, the second pressure relief hole, and the third pressure relief hole may be acoustic holes (i.e., second acoustic holes) at different positions on a housing corresponding to a second acoustic cavity. As shown in FIG. 22, the curves a1, a2, b1, b2, c1, c2, d1, and d2 all reach a low point near 3.9 kHz, and in a frequency band near 3.9 kHz, the curves a2, b2, c2, and d2 are all correspondingly lower than the curves a1, b1, c1, and d1. It may be seen that the sound absorption center frequencies of two micro-perforated plate arrangements corresponding to the acoustic device 1900 and the acoustic device 2100 are both 3.9 kHz, and a sound absorption effect of the micro-perforated plate corresponding to the acoustic device 1900 is better than a sound absorption effect of the micro-perforated plate corresponding to the acoustic device 2100. When the magnetic conductive cover 21243 serves as the micro-perforated plate, a cavity on which the micro-perforated plate sound absorption structure acts may be a cavity of the magnetic gap between the magnetic conductive cover 21243 and the magnet (not shown) instead of the second acoustic cavity (not shown) in the acoustic device 2100, therefore, the micro-perforated plate sound absorption structure may have a limited absorption effect on the sound waves in the second acoustic cavity. In some embodiments, the micro-perforated plate 1951 shown in FIGS. 19 and 20, and the magnetic conductive cover 21243 shown in FIG. 21 may be provided as the sound absorption structure of the acoustic device at the same time, so that the sound absorption structure may have a relatively large count of through holes and a better the sound absorption effect.

The basic concept has been described above. Obviously, for those skilled in the art, the above detailed disclosure is only an example, and does not constitute a limitation to the present disclosure. Although not explicitly stated here, those skilled in the art may make various modifications, improvements, and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, “one embodiment,” “an embodiment,” and/or “some embodiments” refer to a certain feature, structure or characteristic related to at least one embodiment of the present disclosure. Therefore, it should be emphasized and noted that references to “one embodiment” or “an embodiment” or “an alternative embodiment” two or more times in different places in the present disclosure do not necessarily refer to the same embodiment. In addition, some features, structures, or features in the present disclosure of one or more embodiments may be appropriately combined.

In addition, those skilled in the art will understand that various aspects of the present disclosure may be illustrated and described in several patentable categories or situations, including any new and useful process, machine, product, or combination of substances, or any new and useful improvements thereto. Accordingly, all aspects of the present disclosure may be performed entirely by hardware, may be performed entirely by software (including firmware, resident software, microcode, etc.), or may be performed by a combination of hardware and software. The above hardware or software can be referred to as “data block,” “module,” “engine,” “unit,” “component,” or “system.” In addition, aspects of the present disclosure may be presented as a computer product located in one or more computer-readable mediums, the product including computer-readable program code.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term “about,” “approximate,” or “substantially.” For example, “about,” “approximate,” or “substantially” may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An acoustic device, comprising:

a diaphragm;

a housing configured to accommodate the diaphragm and form a first acoustic cavity and a second acoustic cavity respectively corresponding to a front side and a rear side of the diaphragm, wherein the diaphragm radiates sounds to the first acoustic cavity and the second acoustic cavity, respectively, the sounds are guided through a first acoustic hole coupled with the first acoustic cavity and a second acoustic hole coupled with the second acoustic cavity, respectively, and the first acoustic hole and the second acoustic hole form dipole sound sources; and a sound absorption structure, wherein the sound absorption structure is coupled with the second acoustic cavity and is configured to absorb the sound transmitted to the second acoustic hole through the second acoustic cavity in a target frequency range, the target frequency range including a resonant frequency of the second acoustic cavity.

2. The acoustic device of claim 1, wherein the target frequency range further includes a resonant frequency of the first acoustic cavity.

3. The acoustic device of claim 1, wherein the target frequency range includes 3 kHz-6 KHz.

4. The acoustic device of claim 3, wherein the sound absorption structure has a sound absorption effect of greater than or equal to 3 dB on the sound in the target frequency range.

5. The acoustic device of claim 3, wherein the sound absorption structure has a sound absorption effect of greater than or equal to 14 dB on the sound at the resonant frequency.

6. The acoustic device of claim 1, wherein the sound absorption structure includes a micro-perforated plate and a cavity, and the micro-perforated plate includes at least one through hole, the second acoustic cavity coupled with the sound absorption structure being in flow communication with the cavity through the at least one through hole.

7. The acoustic device of claim 6, wherein the cavity is at least partially filled with a filling ratio of the filling materials in the cavity is in a range of 70%-95%.

8. The acoustic device of claim 6, wherein a ratio of a hole spacing between two through holes in the at least one through hole to a hole diameter of the at least one through hole is greater than 5.

9. The acoustic device of claim 6, wherein a hole diameter of the at least one through hole is in a range of 0.1 mm-0.2 mm, a perforation rate of the micro-perforated plate is in a range of 2%-5%, a plate thickness of the micro-perforated plate is in a range of 0.2 mm-0.7 mm, and a height of the cavity is in a range of 7 mm-10 mm.

10. The acoustic device of claim 6, wherein a hole diameter of the at least one through hole is in a range of 0.2 mm-0.4 mm, a perforation rate of the micro-perforated plate is in a range of 1%-5%, a plate thickness of the micro-perforated plate is in a range of 0.2 mm-0.7 mm, and a height of the cavity is in a range of 4 mm-9 mm.

11. The acoustic device of claim 6, wherein the micro-perforated plate includes a runway-type micro-perforated plate or a circular micro-perforated plate, and a plate thickness of the circular micro-perforated plate in a range of 0.3 mm-1 mm.

12. The acoustic device of claim 6, wherein an intrinsic frequency of the micro-perforated plate is greater than 500 Hz.

13. The acoustic device of claim 12, wherein the intrinsic frequency of the micro-perforated plate is in a range of 500 Hz-3.6 KHz.

14. The acoustic device of claim 6, wherein a height of the cavity is in a range of 0.5 mm-10 mm.

15. The acoustic device of claim 6, wherein a waterproof and breathable structure is disposed on a side of the micro-perforated plate facing the diaphragm.

16. The acoustic device of claim 6, further comprising:

a magnetic circuit assembly; and a coil, wherein the coil is connected to the diaphragm, at least a portion of the coil is disposed in a magnetic gap formed by the magnetic circuit assembly, and the coil drives the diaphragm to vibrate to produce the sounds when energized, the micro-perforated plate including an annular structure disposed around the magnetic circuit assembly.

17. The acoustic device of claim 6, further comprising:

a magnetic circuit assembly; and a coil, wherein the coil is connected to the diaphragm, at least a portion of the coil is disposed in a magnetic gap formed by the magnetic circuit assembly, and the coil drives the diaphragm to vibrate to produce the sounds when energized, the micro-perforated plate and the magnetic circuit assembly being disposed at an interval in a vibration direction of the diaphragm.

18. The acoustic device of claim 6, further comprising:

a magnetic circuit assembly; and a coil, wherein the coil is connected to the diaphragm, at least a portion of the coil is disposed in a magnetic gap formed by the magnetic circuit assembly, and the coil drives the diaphragm to vibrate to produce the sounds when energized, the micro-perforated plate including a magnetic conductive element in the magnetic circuit assembly.

19. An acoustic device, comprising:

a diaphragm;

a housing configured to accommodate the diaphragm and form a first acoustic cavity and a second acoustic cavity respectively corresponding to a front side and a rear side of the diaphragm, wherein the diaphragm radiates sounds to the first acoustic cavity and the second acoustic cavity, respectively, the sounds are guided through a first acoustic hole coupled with the first acoustic cavity and a second acoustic hole coupled with the second acoustic cavity, respectively, and the first acoustic hole and the second acoustic hole form dipole sound sources; and a sound absorption structure, wherein the sound absorption structure is coupled with the second acoustic cavity and is configured to absorb the sound transmitted to the second acoustic hole through the second acoustic cavity in a target frequency range, and in the target frequency range, a sound pressure level at the second acoustic hole when the sound absorption structure is not disposed is greater than a sound pressure level at the second acoustic hole when the sound absorption structure is disposed.

20. The acoustic device of claim 6, wherein the cavity is at least partially filled with a porous sound absorption material, and a porosity of the porous sound absorption material is greater than 70%.

* * * * *